(12) United States Patent
Niimoto et al.

(10) Patent No.: US 11,098,205 B2
(45) Date of Patent: Aug. 24, 2021

(54) ANTIFOULING COATING COMPOSITION, ANTIFOULING COATING FILM, SUBSTRATE WITH ANTIFOULING COATING FILM AND METHOD FOR PRODUCING SAME, AND ANTIFOULING METHOD

(71) Applicant: CHUGOKU MARINE PAINTS, LTD., Otake (JP)

(72) Inventors: Jyunji Niimoto, Otake (JP); Soichiro Tanino, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 133 days.

(21) Appl. No.: 16/346,935

(22) PCT Filed: Nov. 9, 2016

(86) PCT No.: PCT/JP2016/083251
§ 371 (c)(1),
(2) Date: May 2, 2019

(87) PCT Pub. No.: WO2018/087846
PCT Pub. Date: May 17, 2018

(65) Prior Publication Data
US 2020/0056055 A1    Feb. 20, 2020

(51) Int. Cl.
| C09D 7/45 | (2018.01) |
| C08G 77/442 | (2006.01) |
| C08K 3/22 | (2006.01) |
| C08K 13/02 | (2006.01) |
| C09D 183/10 | (2006.01) |
| C09D 5/16 | (2006.01) |
| C08K 5/3445 | (2006.01) |

(52) U.S. Cl.
CPC ......... *C09D 5/1675* (2013.01); *C08G 77/442* (2013.01); *C08K 3/22* (2013.01); *C08K 5/3445* (2013.01); *C08K 13/02* (2013.01); *C09D 5/1625* (2013.01); *C09D 7/45* (2018.01); *C09D 183/10* (2013.01); *C08K 2003/2296* (2013.01)

(58) Field of Classification Search
None
See application file for complete search history.

(56) References Cited

U.S. PATENT DOCUMENTS

| 2011/0123478 | A1* | 5/2011 | Dahling | C09D 5/165 |
| | | | | 424/78.09 |
| 2012/0202076 | A1* | 8/2012 | Ehara | C09D 193/04 |
| | | | | 428/446 |
| 2013/0045264 | A1* | 2/2013 | Masuda | C09D 5/1625 |
| | | | | 424/409 |
| 2015/0141562 | A1* | 5/2015 | Fukuta | C08K 3/22 |
| | | | | 524/270 |
| 2015/0299515 | A1* | 10/2015 | Tanino | C09D 183/04 |
| | | | | 524/102 |
| 2020/0056055 | A1* | 2/2020 | Niimoto | C08K 3/22 |

FOREIGN PATENT DOCUMENTS

| CN | 102083925 A | 6/2011 |
| CN | 102686683 A | 9/2012 |
| CN | 102791812 A | 11/2012 |
| JP | 2001-72869 A | 3/2001 |
| JP | 2006-77095 A | 3/2006 |
| JP | 2016-501951 A | 1/2016 |
| JP | 2016-527244 A | 9/2016 |
| WO | WO 2011/046087 A1 | 4/2011 |
| WO | WO 2011/118526 A1 | 9/2011 |
| WO | WO 2014/077205 A1 | 5/2014 |

OTHER PUBLICATIONS

Extended European Search Report dated May 26, 2020 in European Patent Application No. 16921136.4, 6 pages.
"Biocide Selektope Could Revolutionize Anti-fouling", The Maritime Executive, Retrieved from the internet:: URL: https://www.maritime-executive.com/article/biocide-selectope-could-revolutionize-anti-fouling, Nov. 3, 2015, XP002798928, 8 pages.
Combined Chinese Office Action and Search Report dated Sep. 14, 2020 in Patent Application No. 201680090630.X (with English translation of Category of Cited Documents), 10 pages.
International Search Report dated Dec. 20, 2016 in PCT/JP2016/083251 filed on Nov. 9, 2016.

* cited by examiner

*Primary Examiner* — Peter A Salamon
(74) *Attorney, Agent, or Firm* — Oblon, McClelland, Maier & Neustadt, L.L.P.

(57) ABSTRACT

The present invention is to provide an antifouling coating composition capable of forming an antifouling coating film that exhibits a high antifouling performance even in a marine area having a heavy fouling load by animal species such as barnacles, has excellent slime resistance, and is prevented from cracking. Further, the present invention is also to provide an antifouling coating film, a substrate with an antifouling coating film and a method of producing the substrate, and an antifouling method, each using the composition. The antifouling coating composition of the present invention contains a polyorganosiloxane block-containing hydrolyzable copolymer (A) and medetomidine (B), wherein the polyorganosiloxane block-containing hydrolyzable copolymer (A) contains (i) a constituent unit derived from a hydrolyzable group-containing monomer (a1) and (ii) a constituent unit derived from a polyorganosiloxane block-containing monomer (a2).

16 Claims, No Drawings

ANTIFOULING COATING COMPOSITION, ANTIFOULING COATING FILM, SUBSTRATE WITH ANTIFOULING COATING FILM AND METHOD FOR PRODUCING SAME, AND ANTIFOULING METHOD

TECHNICAL FIELD

The present invention relates to an antifouling coating composition; and an antifouling coating film, a substrate with an antifouling coating film and a method of producing the substrate, and an antifouling method, each using the composition.

BACKGROUND ART

At present, as a method of preventing fouling of ships and the like, which is caused by aquatic organisms, a method using a hydrolyzable polymer which provides a coating film having a renewal property from the surface thereof in water is being used widely.

An antifouling coating film that contains such a hydrolyzable polymer as a binder is hydrophilized from the surface thereof by hydrolysis in water, and the hydrophilized part is polished away by water flows to exhibit renewability of the coating film. For controlling the hydrophilicity and the water repellency of such a hydrolyzable resin to further improve the antifouling performance of the film, a formulation containing a silicone (polyorganosiloxane) component is under investigation.

For example, PTL 1 discloses an antifouling coating composition that contains a hydrolyzable resin containing a constituent unit derived from a silicon-containing polymerizable monomer and a constituent unit derived from a metal salt-containing hydrolyzable monomer.

CITATION LIST

Patent Literature

PTL 1: WO2011/046087

SUMMARY OF INVENTION

Technical Problem

PTL 1 describes that the antifouling coating composition contains a silicone-introduced metal salt. However, in a marine area having a heavy fouling load by animal species such as barnacles, the antifouling effect against them is insufficient and there is room for further improvement.

In consideration of such problems, an object of the present invention is to provide an antifouling coating composition capable of forming an antifouling coating film that exhibits a high antifouling performance even in a marine area having a heavy fouling load by animal species such as barnacles, is excellent slime resistance, and is prevented from cracking. Further objects of the present invention are to provide an antifouling coating film, a substrate with an antifouling coating film and a method of producing the substrate, and an antifouling method, each using the composition.

Solution to Problem

As a result of the earnest investigations made by the present inventors, it has been found that the use of the antifouling coating composition shown below can solve the problems, and thus the present invention has been completed.

The gist of the present invention is as follows.

The present invention relates to the following items [1] to [27].

[1] An antifouling coating composition containing a polyorganosiloxane block-containing hydrolyzable copolymer (A) and medetomidine (B), wherein the polyorganosiloxane block-containing hydrolyzable copolymer (A) contains (i) a constituent unit derived from a hydrolyzable group-containing monomer (a1) and (ii) a constituent unit derived from a polyorganosiloxane block-containing monomer (a2).

[2] The antifouling coating composition according to the item [1], wherein the polyorganosiloxane block-containing hydrolyzable copolymer (A) further contains (iii) a constituent unit derived from any other monomer (a3).

[3] The antifouling coating composition according to the item [1] or [2], wherein the hydrolyzable group-containing monomer (a1) contains a monomer (a11) represented by the following formula (1-1).

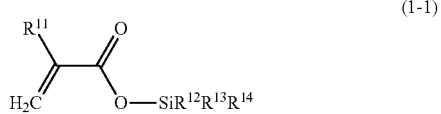

(1-1)

In the formula (1-1), $R^{11}$ represents a hydrogen atom or a methyl group, preferably a methyl group; and $R^{12}$, $R^{13}$ and $R^{14}$ each independently represent a monovalent hydrocarbon group, preferably an alkyl group having 1 to 12 carbon atoms or an aryl group having 6 to 14 carbon atoms, more preferably an alkyl group having 1 to 8 carbon atoms or an aryl group having 6 to 10 carbon atoms, even more preferably an isopropyl group, an n-propyl group, a sec-butyl group, an n-butyl group or a phenyl group, and further more preferably all of $R^{12}$ to $R^{14}$ are isopropyl groups.

[4] The antifouling coating composition according to the item [3], wherein the polyorganosiloxane block-containing hydrolyzable copolymer (A) contains 10 to 90 parts by mass of the constituent unit derived from the monomer (a11) relative to 100 parts by mass of all the constituent units, preferably 40 to 80 parts by mass, more preferably 45 to 70 parts by mass and further more preferably 45 to 65 parts by mass.

[5] The antifouling coating composition according to the item [1] or [2], wherein the hydrolyzable group-containing monomer (a1) contains at least one of a monomer (a12) represented by the following formula (1-2) and a monomer (a13) represented by the following formula (1-3).

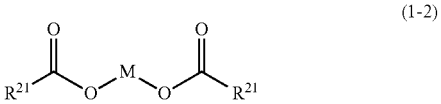

(1-2)

In the formula (1-2), $R^{21}$ each independently represents a monovalent group containing a terminal ethylenically unsaturated group, preferably a group resulting from removal of a carboxy group from an aliphatic unsaturated monocarboxylic acid containing a terminal ethylenically unsaturated group, or a group resulting from removal of one carboxy group from an aliphatic unsaturated dicarboxylic acid containing a terminal ethylenically unsaturated group, more preferably a group resulting from removal of a carboxy group from an acrylic acid, a methacrylic acid, or a (meth) acryloyloxyalkylcarboxylic acid, and even more preferably a group resulting from removal of a carboxy group from an acrylic acid or a methacrylic acid; and M represents a metal, preferably copper or zinc, more preferably zinc.

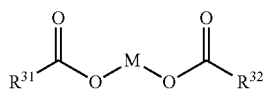
(1-3)

In the formula (1-3), $R^{31}$ represents a monovalent group containing a terminal ethylenically unsaturated group, preferably a group resulting from removal of a carboxy group from an aliphatic unsaturated monocarboxylic acid containing a terminal ethylenically unsaturated group, or a group resulting from removal of one carboxy group from an aliphatic unsaturated dicarboxylic acid containing a terminal ethylenically unsaturated group, more preferably a group resulting from removal of a carboxy group from an acrylic acid, a methacrylic acid, or a (meth)acryloyloxyalkylcarboxylic acid, and even more preferably a group resulting from removal of a carboxy group from an acrylic acid or a methacrylic acid; $R^{32}$ represents a monovalent organic group having 1 to 30 carbon atoms containing no terminal ethylenically unsaturated group, preferably an organic acid residue formed from a monobasic acid, more preferably a group resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dehydroabietic acid, 12-hydroxystearic acid, and naphthenic acid, even more preferably a group resulting from removal of a carboxy group from abietic acid, versatic acid and naphthenic acid, and further more preferably a group resulting from removal of a carboxy group from abietic acid or versatic acid; and M represents a metal, preferably copper or zinc, and more preferably zinc.

[6] The antifouling coating composition according to the item [5], wherein the hydrolyzable group-containing monomer (a1) contains at least one selected from a monomer (a12') represented by the following formula (1-2') and a monomer (a13') represented by the following formula (1-3').

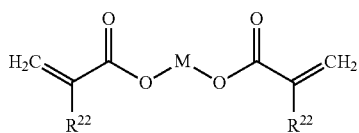
(1-2')

In the formula (1-2'), $R^{22}$ each independently represents a hydrogen atom or a methyl group; and M represents copper or zinc, and preferably zinc.

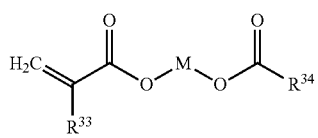
(1-3')

In the formula (1-3'), $R^{33}$ represents a hydrogen atom or a methyl group; $R^{34}$ represents a monovalent organic group having 1 to 30 carbon atoms containing no terminal ethylenically unsaturated group, preferably an organic acid residue formed from a monobasic acid, more preferably a group resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dehydroabietic acid, 12-hydroxystearic acid, and naphthenic acid, even more preferably a group resulting from removal of a carboxy group from abietic acid, versatic acid, or naphthenic acid, and further more preferably a group resulting from removal of a carboxy group from abietic acid or versatic acid; and M represents copper or zinc, and preferably zinc.

[7] The antifouling coating composition according to the item [5], wherein the hydrolyzable copolymer (A) contains the constituent units derived from the monomers (a12) and (a13) in a total of 3 to 40 parts by mass relative to 100 parts by mass of all the constituent units, preferably 5 to 30 parts by mass.

[8] The antifouling coating composition according to any one of the items [1] to [7], wherein the polyorganosiloxane block-containing monomer (a2) is represented by the following formula (2).

(2)

In the formula (2), $R^1$, $R^2$ and $R^3$ each independently represent a monovalent hydrocarbon group, preferably a linear, branched or cyclic alkyl group (preferably having 1 to 12, more preferably 1 to 8, even more preferably 1 to 4 carbon atoms), or an aryl group (preferably having 6 to 14, more preferably 6 to 10 carbon atoms), more preferably an alkyl group (preferably having 1 to 12, more preferably 1 to 8, even more preferably 1 to 4 carbon atoms); X each independently represents a (meth)acryloyloxyalkyl group or a mercaptoalkyl group, preferably a (meth)acryloyloxyethyl group, a (meth)acryloyloxypropyl group, a (meth)acryloyloxybutyl group or a mercaptomethyl group, a mercaptoethyl group, a mercaptopropyl group or a mercaptobutyl group; m represents 1 or more; n represents 0 or more; and p and q each independently represent 0 or 1, provided that n+p+q is 1 or more.

[9] The antifouling coating composition according to the item [8], wherein in the formula (2), m+n is 2 or more.

[10] The antifouling coating composition according to the item [8] or [9], wherein the hydrolyzable copolymer (A) is at least one of the following hydrolyzable copolymer (A1) to hydrolyzable copolymer (A3).

Hydrolyzable copolymer (A1): in the formula (2), n is 0, p is 1, q is 0, and m is preferably 3 to 200, more preferably 5 to 70.

Hydrolyzable copolymer (A2): in the formula (2), n is 0, p and q each is 1, and m is preferably 3 to 200, more preferably 5 to 70.

Hydrolyzable copolymer (A3): in the formula (2), n is 1 or more, preferably 1 to 30, and m is preferably 50 to 1,000.

[11] The antifouling coating composition according to any one of the items [1] to [10], wherein the polyorganosiloxane block-containing hydrolyzable copolymer (A) contains 1 to 50% by mass of a constituent unit derived from a polyorganosiloxane block-containing monomer (a2), preferably 2 to 50% by mass, and more preferably 5 to 50% by mass.

The antifouling coating composition according to any one of the items [1] to [11], containing the polyorganosiloxane block-containing hydrolyzable copolymer (A) in an amount of 10% by mass or more based on the solid content of the antifouling coating composition.

The antifouling coating composition according to any one of the items [1] to [12], wherein the polyorganosiloxane block-containing hydrolyzable copolymer (A) has a constituent unit derived from a silyl ester group-containing monomer, preferably a monomer (a11), and the content of the polyorganosiloxane block-containing hydrolyzable copolymer (A) based on the solid content of the antifouling coating composition is preferably 5 to 60% by mass, more preferably 10 to 50% by mass, and even more preferably 12 to 35% by mass.

The antifouling coating composition according to any one of the items [1] to [12], wherein the polyorganosiloxane block-containing hydrolyzable copolymer (A) has a constituent unit derived from a metal ester group-containing monomer, preferably a monomer (a12) and/or a monomer (a13), and the content of the polyorganosiloxane block-containing hydrolyzable copolymer (A) based on the solid content of the antifouling coating composition is 10 to 99% by mass, more preferably 15 to 95% by mass, even more preferably 20 to 90% by mass, and further more preferably 25 to 88% by mass.

The antifouling coating composition according to any one of the items [1] to [14], containing the medetomidine (B) in an amount of 0.01 to 5% by mass based on the solid content of the antifouling coating composition, preferably 0.03 to 3% by mass, more preferably 0.05 to 1% by mass and even more preferably 0.05 to 0.5% by mass.

[16] The antifouling coating composition according to any one of the items [1] to [15], further containing zinc oxide (C).

[17] The antifouling coating composition according to the item [16], wherein the content of zinc oxide (C) based on the solid content of the antifouling coating composition is 0.1 to 60% by mass, preferably 1 to 40% by mass, more preferably 1.5 to 25% by mass.

[18] The antifouling coating composition according to any one of the items [1] to [17], further containing a polyester-based polymer (D).

[19] The antifouling coating composition according to the item [18], wherein the hydroxyl value of the solid content of the polyester-based polymer (D) is 50 to 150 mgKOH/g, preferably 80 to 120 mgKOH/g.

[20] The antifouling coating composition according to the item [18] or [19], wherein the content of the polyester-based polymer (D) based on the solid content of the antifouling coating composition is 0.1 to 40% by mass, preferably 0.5 to 30% by mass, more preferably 1.0 to 20% by mass.

[21] The antifouling coating composition according to any one of the items [1] to [20], further containing a wetting dispersant (E).

[22] The antifouling coating composition according to the item [21], wherein the content of the wetting dispersant (E) based on the solid content of the antifouling coating composition is 0.01 to 10% by mass, preferably 0.1 to 5% by mass.

[23] The antifouling coating composition according to any one of the items [1] to [22], wherein the antifouling coating composition contains at least one selected from the group consisting of any other antifouling agent (F), a monocarboxylic acid compound (G) and/or a salt thereof, any other pigment (H), any other binder component (I), a dehydrating agent (J), a solvent (K), an anti-sagging agent/anti-settling agent (L), and a plasticizer (M).

[24] An antifouling coating film, which is formed with the antifouling coating composition according to any one of the items [1] to [23].

[25] A substrate with an antifouling coating film, wherein the substrate is coated with the antifouling coating film according to the item [24].

[26] A method for producing a substrate with an antifouling coating film, including: (I) a step of providing an applied body or an impregnated body by applying the antifouling coating composition according to any one of [1] to [23] on a substrate or impregnating a substrate with the antifouling coating composition according to any one of the items [1] to [23], and (II) a step of drying the applied body or the impregnated body.

[27] An antifouling method including using the antifouling coating film according to the item [24].

Advantageous Effects of Invention

According to the present invention, there can be provided an antifouling coating composition capable of forming an antifouling coating film that can exhibit a high antifouling performance even in a marine area having a heavy fouling load by animal species such as barnacles, can be excellent in resistance to slimes and can be prevented from cracking. Further, according to the present invention, there can also be provided an antifouling coating film, a substrate with an antifouling coating film and a method of producing the substrate, and an antifouling method, each using the antifouling coating composition.

DESCRIPTION OF EMBODIMENTS

The antifouling coating composition, the antifouling coating film, the substrate with an antifouling coating film and the method for producing the same, and the antifouling method according to the present invention will be described in detail below.

In the description herein, "(meth)acryloyl", "(meth)acrylate" and "(meth)acrylic acid" mean "acryloyl or methacryloyl", "acrylate or methacrylate" and "acrylic acid or methacrylic acid", respectively.

[Antifouling Coating Composition]

The antifouling coating composition (which may be hereinafter referred simply to as a "coating composition") of the present invention contains a polyorganosiloxane block-containing hydrolyzable copolymer (A) and medetomidine (B), wherein the polyorganosiloxane block-containing hydrolyzable copolymer (A) contains (i) a constituent unit derived from a hydrolyzable group-containing monomer (a1) and (ii) a constituent unit derived from a polyorganosiloxane block-containing monomer (a2).

According to the present invention, there can be provided an antifouling coating composition capable of forming an antifouling coating film that can exhibit a high antifouling performance even in a marine area having a heavy fouling load by animal species such as barnacles, can be excellent in resistance to slimes and can be prevented from cracking.

The antifouling coating composition described in PTL 1 could not attain a sufficient antifouling performance in a marine area having a heavy fouling load by animal species such as barnacles. As a result of assiduous studies made by the present inventors, the present inventors have found that, by combining a polyorganosiloxane block-containing hydrolyzable copolymer (A) and medetomidine (B), the antifouling effect against animal species such as barnacles can be improved and the aforementioned problems can be solved, and have completed the present invention. As a further unpredictable effect, the present inventors have found that cracking the antifouling coating film of the present invention can be prevented.

While details of the functional mechanism of the aforementioned effects is not necessarily clear, a part thereof can be estimated as follows. Specifically, it is estimated that, as containing the specific polyorganosiloxane block-containing hydrolyzable copolymer (A), the antifouling coating film can be given suitable water resistance and renewability from the surface thereof in water, and therefore can maintain slime resistance for a longer period of time. Further, as containing medetomidine (B), the antifouling coating film can be given a high antifouling performance against animal species such as barnacles.

The components contained in the antifouling coating composition of the present invention will be described in detail below.

<Polyorgaosiloxane Block-Containing Hydrolyzable Copolymer (A)>

In the present invention, the polyorganosiloxane block-containing hydrolyzable copolymer (A) (which may be hereinafter referred simply to as a hydrolyzable copolymer (A)) contains (i) a constituent unit derived from a hydrolyzable group-containing monomer (a1) and (ii) a constituent unit derived from a polyorganosiloxane block-containing monomer (a2). The hydrolyzable copolymer (A) may optionally contain (iii) a constituent unit derived from any other monomer (a3), and preferably contains (iii) a constituent unit derived from any other monomer (a3).

In the present invention, the "copolymer having a constituent unit derived from A" means a copolymer with A introduced thereinto through polymerization or chain transfer. Accordingly, for example, in the case where the polyorganosiloxane block-containing monomer (a2) has a mercapto group, the radical polymerization terminal draws H from —SH and the resultant —S● (S radical) initiates polymerization and is introduced into the hydrolyzable copolymer, and also in such a case, the hydrolyzable copolymer (A) has a constituent unit derived from the polyorganosiloxane block-containing monomer (a2).

The constituent units are described below.

[(i) Constituent Unit Derived from Hydrolyzable Group-Containing Monomer (a1)]

The polyorganosiloxane block-containing hydrolyzable copolymer (A) has (i) a constituent unit derived from a hydrolyzable group-containing monomer (a1).

Preferred examples of the hydrolyzable monomer (a1) include a silyl ester group-containing monomer or a metal ester group-containing monomer, and a metal ester group-containing monomer is more preferred.

The content of the constituent unit derived from the hydrolyzable monomer (a1) in the hydrolyzable copolymer (A) is preferably 3 to 80 parts by mass, more preferably 5 to 70 parts by mass, based on the total constituent units, 100 parts by mass, of the hydrolyzable copolymer.

(Silyl Ester Group-Containing Monomer)

Preferably, the hydrolyzable monomer (a1) contains a silyl ester group-containing monomer (a11) represented by the following formula (1-1).

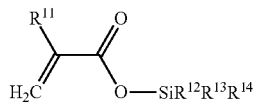

(1-1)

In the formula (1-1), $R^{11}$ represents a hydrogen atom or a methyl group; and $R^{12}$, $R^{13}$ and $R^{14}$ each independently represent a monovalent hydrocarbon group.

In the formula (1-1), $R^{11}$ represents a hydrogen atom or a methyl group, and is, from the viewpoint of bettering long-term antifouling performance and water resistance of the antifouling coating film, preferably a methyl group.

In the formula (1-1), $R^{12}$, $R^{13}$ and $R^{14}$ each independently represent a monovalent hydrocarbon group. Such a hydrocarbon group includes a linear, branched or cyclic alkyl group, and an aryl group. The alkyl group preferably has 1 to 12, more preferably 1 to 8, and even more preferably 1 to 4 carbon atoms. The aryl group preferably has 6 to 14, more preferably 6 to 10 carbon atoms. From the viewpoint of imparting suitable hydrolyzability to the antifouling coating film to thereby better the long-term antifouling performance and the water resistance of the film, preferably, $R^{12}$ to $R^{14}$ each are selected from an isopropyl group, an n-propyl group, a sec-butyl group, an n-butyl group and a phenyl group, and more preferably all of $R^{12}$ to $R^{14}$ are isopropyl groups.

Namely, the silyl ester group-containing monomer is especially preferably triisopropylsilyl (meth)acrylate, and most preferably triisopropylsilyl methacrylate.

In the case where the hydrolyzable copolymer (A) has a constituent unit derived from the monomer (a11), the amount of the constituent unit derived from the monomer (a11) relative to all the constituent units, 100 parts by mass, is, from the viewpoint of bettering the water resistance of the antifouling coating film, preferably 10 to 90 parts by mass, more preferably 40 to 80 parts by mass, even more preferably 45 to 70 parts by mass, and further more preferably 45 to 65 parts by mass.

The ratio of each content (mass) of the constituent units derived from the monomers in the hydrolyzable copolymer (A) may be considered to be the same as the ratio of the charged amount (mass) of the monomers (reactive raw materials) used in polymerization.

(Metal Ester Group-Containing Monomer)

In the present invention, the hydrolyzable group-containing monomer (a1) preferably contains a metal ester group-containing monomer, and the metal ester group-containing monomer preferably contains at least one of a monomer (a12) represented by the following formula (1-2) and a monomer (a13) represented by the following formula (1-3).

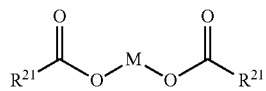

(1-2)

In the formula (1-2), $R^{21}$ each independently represents a monovalent group containing a terminal ethylenically unsaturated group; and M represents a metal.

Examples of the metal to constitute the metal ester group include magnesium, calcium, neodymium, titanium, zirconium, iron, ruthenium, cobalt, nickel, copper, zinc, and aluminum.

In the formula (1-2), M is a divalent metal, and from among the aforementioned metals, a divalent metal may be appropriately selected for use for M. Among these, Group 10 to 12 metals such as nickel, copper and zinc are preferred; copper and zinc are more preferred; and zinc is even more preferred.

In the formula (1-2), $R^{21}$ represents a monovalent group containing a terminal ethylenically unsaturated group ($CH_2=C<$), and the carbon number of $R^{21}$ is preferably 2 to 50, more preferably 2 to 30, even more preferably 2 to 10, and further more preferably 2 to 6. So far as having a terminal ethylenically unsaturated group, $R^{21}$ may have an ethylenically unsaturated group in any other than the terminal, but preferably has an ethylenically unsaturated group only at the terminal.

Preferably, $R^{21}$ is an unsaturated aliphatic hydrocarbon group having a terminal ethylenically unsaturated group, and in which the unsaturated aliphatic hydrocarbon group may have an ester bond, an amide bond, and an ether bond in the carbon chain thereof. Specifically, examples of $R^{21}$ include groups resulting from removal of a carboxy group from an aliphatic unsaturated monocarboxylic acid having a terminal ethylenically unsaturated group, such as acrylic acid (2-propenoic acid), methacrylic acid (2-methyl-2-propenoic acid), 3-butenoic acid, 4-pentenoic acid, 10-undecenoic acid, 3-(meth)acryloyloxypropionic acid, and 3-(meth)acryloyloxy-2-methylpropionic acid. Other examples thereof include groups resulting from removal of one carboxy group from an aliphatic unsaturated dicarboxylic acid having a terminal ethylenically unsaturated group such as itaconic acid.

Among these, $R^{21}$ is preferably a group resulting from removal of a carboxy group from an aliphatic unsaturated monocarboxylic acid having a terminal ethylenically unsaturated group, more preferably a group resulting from removal of a carboxy group from an acrylic acid, a methacrylic acid or a (meth)acryloyloxyalkylcarboxylic acid, and even more preferably a group resulting from removal of a carboxy group from an acrylic acid or a methacrylic acid.

Such a monomer (a12) is preferably a monomer (a12') represented by the following formula (1-2').

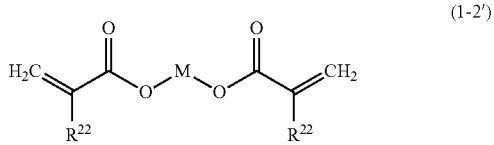

(1-2')

In the formula (1-2'), $R^{22}$ each independently represents a hydrogen atom or a methyl group; and M represents copper or zinc.

Examples of the monomer (a12) represented by the formula (1-2) include zinc diacrylate, zinc dimethacrylate, zinc acrylate(methacrylate), zinc di(3-acryloyloxypropionate), zinc di(3-methacryloyloxypropionate), zinc di(3-(meth)acryloyloxy-2-methylpropionate), copper diacrylate, copper dimethacrylate, copper acrylate(methacrylate), copper di(3-acryloyloxypropionate), copper di(3-methacryloyloxypropionate), and copper di(3-(meth)acryloyloxy-2-methylpropionate).

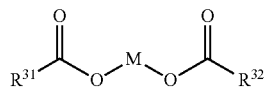

(1-3)

In the formula (1-3), $R^{31}$ represents a monovalent group containing a terminal ethylenically unsaturated group; $R^{32}$ represents a monovalent organic group having 1 to 30 carbon atoms containing no terminal ethylenically unsaturated group; and M represents a metal.

In the formula (1-3), $R^{31}$ represents a monovalent group containing a terminal ethylenically unsaturated group. For $R^{31}$, the same groups as those of $R^{21}$ in the formula (1-2) are exemplified, and the preferred embodiments thereof are also the same as those of $R^{21}$.

In the formula (1-3), $R^{32}$ represents a monovalent organic group having 1 to 30 carbon atoms containing no terminal ethylenically unsaturated group. Examples of $R^{32}$ include an aliphatic hydrocarbon group having 1 to 30 carbon atoms, an alicyclic hydrocarbon group having 3 to 30 carbon atoms and an aromatic hydrocarbon group having 6 to 30 carbon atoms, each containing no terminal ethyleneically unsaturated group. These groups may have a substituent. Examples of the substituent include a hydroxy group.

The aliphatic hydrocarbon group may be linear or branched, and may be a saturated aliphatic hydrocarbon group or an unsaturated aliphatic hydrocarbon group. In the case where $R^{32}$ is an unsaturated aliphatic hydrocarbon group, $R^{32}$ does not have a terminal ethylenically unsaturated group. The carbon number of the aliphatic hydrocarbon group is 1 to 30, preferably 1 to 28, more preferably 1 to 26, and even more preferably 1 to 24. The aliphatic hydrocarbon group may be further substituted with an alicyclic hydrocarbon group or an aromatic hydrocarbon group.

The alicyclic hydrocarbon group may be a saturated alicyclic hydrocarbon group, or an unsaturated alicyclic hydrocarbon group. The carbon number of the alicyclic hydrocarbon group is 3 to 30, preferably 4 to 20, more preferably 5 to 16, and even more preferably 6 to 12. The alicyclic hydrocarbon group may be further substituted with an aliphatic hydrocarbon group or an aromatic hydrocarbon group.

The carbon number of the aromatic hydrocarbon group is 6 to 30, preferably 6 to 24, more preferably 6 to 18, and even more preferably 6 to 10. The aromatic hydrocarbon group may be further substituted with an aliphatic hydrocarbon group or an alicyclic hydrocarbon group.

$R^{32}$ is preferably an organic acid residue formed of a monobasic acid, and specifically, examples thereof include groups resulting from removal of a carboxy group from an organic acid selected from the group consisting of versatic acid, palmitic acid, stearic acid, isostearic acid, oleic acid, linoleic acid, linolenic acid, abietic acid, neoabietic acid, pimaric acid, dehydroabietic acid, 12-hydroxystearic acid, and naphthenic acid.

Among these, groups resulting from removal of a carboxy group from abietic acid, versatic acid and naphthenic acid are preferred; and groups resulting from removal of a carboxy group from abietic acid and versatic acid are more preferred.

Such a monomer (a13) is preferably a monomer (a13') represented by the following formula (1-3').

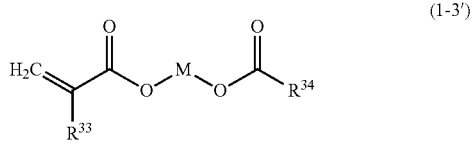

(1-3')

In the formula (1-3'), $R^{33}$ represents a hydrogen atom or a methyl group; $R^{34}$ represents a monovalent organic group having 1 to 30 carbon atoms containing no terminal ethylenically unsaturated group; and M represents copper or zinc.

Examples of the monomer (a13) represented by the formula (1-3) include zinc 3-(meth)acryloyloxypropionate (rosin), zinc 3-(meth)acryloyloxypropionate (versatate), zinc (meth)acrylate (rosin), zinc (meth)acrylate (versatate), zinc (meth)acrylate (naphthenate), copper 3-(meth)acryloyloxypropionate (rosin), copper 3-(meth)acryloyloxypropionate (versatate), copper (meth)acrylate (rosin), copper (meth)acrylate (versatate), and copper (meth)acrylate (naphthenate).

In the case where the hydrolyzable copolymer (A) has a constituent unit derived from the monomer (a13) represented by the formula (1-3), the hydrolyzable copolymer (A) preferably has a constituent unit formed through polymerization of the terminal ethylenically unsaturated group alone in the polymerizable compound (monomer (a13)) represented by the formula (1-3).

In the case where the hydrolyzable copolymer (A) has a constituent unit derived from the monomer (a12) or (a13), the total content of the constituent units derived from the monomers (a12) and (a13) is, from the viewpoint of bettering the antifouling performance and the water resistance of the antifouling coating film, preferably 3 to 40 parts by mass, more preferably 5 to 30 parts by mass, relative to 100 parts by mass of all the constituent units.

[(ii) Constituent Unit Derived from Polyorganosiloxane Block-Containing Monomer (a2)]

The polyorganosiloxane block-containing hydrolyzable copolymer (A) has (ii) a constituent unit derived from a polyorganosiloxane block-containing monomer (a2).

The polyorganosiloxane block-containing monomer (a2) is a monomer having a polyorganosiloxane block and a chain transferable reactive group such as a polymerizable unsaturated group and/or a thiol group, and acts to introduce a polyorganosiloxane block into the hydrolyzable copolymer (A) to be formed especially to improve the antifouling performance such as slime resistance of the resultant copolymer.

The polyorganosiloxane block-containing monomer (a2) is preferably represented by the following formula (2).

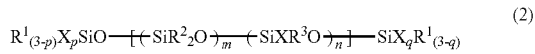

(2)

In the formula (2), $R^1$, $R^2$ and $R^3$ each independently represent a monovalent hydrocarbon group; X each independently represents a (meth)acryloyloxyalkyl group or a mercaptoalkyl group; m represents 1 or more; n represents 0 or more; and p and q each independently represent 0 or 1, provided that n+p+q is 1 or more.

In the formula (2), $R^1$, $R^2$ and $R^3$ each independently represent a monovalent hydrocarbon group, and the hydrocarbon group includes a linear, branched or cyclic alkyl group, and an aryl group. The carbon number of the alkyl group is preferably 1 to 12, more preferably 1 to 8, and even more preferably 1 to 4. The carbon number of the aryl group is preferably 6 to 14, and more preferably 6 to 10. From the viewpoint of polymerization easiness, an alkyl group such as a methyl group or a butyl group is preferred.

In the formula (2), X each independently represents a (meth)acryloyloxyalkyl group or a mercaptoalkyl group, and from the viewpoint of uniform polymerization progression, a (meth)acryloyloxyalkyl group is preferred; and from the viewpoint of reducing the viscosity of the polymer to be formed to facilitate the handling thereof, a mercaptoalkyl group is also preferred. Such X includes a (meth)acryloyloxyethyl group, a (meth)acryloyloxypropyl group, a (meth)acryloyloxybutyl group, a mercaptomethyl group, a mercaptoethyl group, a mercaptopropyl group and a mercaptobutyl group.

In the formula (2), m is 1 or more, n is 0 or more, and p and q each independently are 0 or 1, provided that n+p+q is 1 or more.

m and n mean an average addition molar number of ($SiR^2_2O$) and ($SiXR^3O$), respectively.

In the formula (2), m+n is preferably 2 or more.

In this description, in the case where two or more different repeating units are described in parallel between parentheses [ ], the repeating units may repeat in any form or order of a random configuration, an alternate configuration or a block configuration. Namely, for example, a formula —[$Y_3$—$Z_3$]— (where Y and Z each indicate a repeating unit) may be in any form of a random configuration of —YYZYZZ—, or an alternate configuration of —YZYZYZ— or a block configuration of —YYYZZZ— or —ZZZYYY—.

As one embodiment, the hydrolyzable copolymer (A) preferably has a constituent unit derived from a monomer (a21) of the formula (2) where n is 0, p is 1 and q is 0.

An antifouling coating composition containing a hydrolyzable copolymer (A) having a constituent unit derived from such a monomer (a21) is preferred since the composition can form an antifouling coating film having an especially excellent antifouling performance.

In such a monomer (a21), m is preferably 3 to 200, more preferably 5 to 70 from the viewpoint of polymerization easiness.

As such a monomer (a21), commercial products may be used, and examples thereof include FM-0711 (one-terminal methacryloyloxyalkyl-modified organopolysiloxane, average molecular weight Mn=1,000), FM-0721 (one-terminal methacryloyloxyalkyl-modified organopolysiloxane, average molecular weight Mn=5,000) and FM-0725 (one-terminal methacryloyloxyalkyl-modified organopolysiloxane, average molecular weight Mn=10,000) all manufactured by JNC Corporation; and X-22-174ASX (one-terminal methacryloyloxyalkyl-modified organopolysiloxane, functional group equivalent 900 g/mol), KF-2012 (one-terminal methacryloyloxyalkyl-modified organopolysiloxane, functional group equivalent 4,600 g/mol) and X-22-2426 (one-terminal methacryloyloxyalkyl-modified organopolysiloxane, functional group equivalent 12,000 g/mol) all manufactured by Shin-Etsu Chemical Co., Ltd.

As another embodiment, the hydrolyzable copolymer (A) preferably has a constituent unit derived from a monomer (a22) of the formula (2) where n is 0, p and q are 1.

An antifouling coating composition containing a hydrolyzable copolymer (A) having a constituent unit derived from such a monomer (a22) is preferred since the coating film formed of the composition tends to be have a good overcoating adhesiveness thereto.

In such a monomer (a22), m is preferably 3 to 200, more preferably 5 to 70 from the viewpoint of polymerization easiness.

As such a monomer (a22), commercial products may be used, and examples thereof include FM-7711 (both-terminal methacryloyloxyalkyl-modified organopolysiloxane, average molecular weight Mn=1,000), FM-7721 (both-terminal methacryloyloxyalkyl-modified organopolysiloxane, average molecular weight Mn=5,000) and FM-7725 (both-terminal methacryloyloxyalkyl-modified organopolysiloxane, average molecular weight Mn=10,000) all manufactured by JNC Corporation; and X-22-164 (both-terminal methacryloyloxyalkyl-modified organopolysiloxane, functional group equivalent 190 g/mol), X-22-164AS (both-terminal methacryloyloxyalkyl-modified organopolysiloxane, functional group equivalent 450 g/mol), X-22-164A (both-terminal methacryloyloxyalkyl-modified organopolysiloxane, functional group equivalent 860 g/mol), X-22-164B (both-terminal methacryloyloxyalkyl-modified organopolysiloxane, functional group equivalent 1630 g/mol), X-22-164C (both-terminal methacryloyloxyalkyl-modified organopolysiloxane, functional group equivalent 2,370 g/mol), X-22-164E (both-terminal methacryloyloxyalkyl-modified organopolysiloxane, functional group equivalent 3,900 g/mol), and X-22-167B (both-terminal mercaptoalkyl-modified organopolysiloxane, functional group equivalent 1,670 g/mol) all manufactured by Shin-Etsu Chemical Co., Ltd.

As still another embodiment, the hydrolyzable copolymer (A) preferably has a constituent unit derived from a monomer (a23) of the formula (2) where n is 1 or more.

An antifouling coating composition containing a hydrolyzable copolymer (A) having a constituent unit derived from such a monomer (a23) is preferred since the composition has a low viscosity and is easy to handle.

In such a monomer (a23), m is preferably 50 to 1,000, and n is preferably 1 to 30.

As such a monomer (a23), commercial products may be used, and examples thereof include KF-2001 (side chain-mercaptoalkyl-modified organopolysiloxane, functional group equivalent 1,900 g/mol) and KF-2004 (side chain-mercaptoalkyl-modified organopolysiloxane, functional group equivalent 30,000 g/mol) both manufactured by Shin-Etsu Chemical Co., Ltd.

From the viewpoint of the antifouling performance and the water resistance and also the adhesiveness to an underlying material under dry-wet alternate conditions, the content of the constituent unit derived from the monomer (a2) in the hydrolyzable copolymer (A) is preferably 0.5 to 60 parts by mass relative to 100 parts by mass of all the constituent units therein, more preferably 1 to 50 parts by mass, even more preferably 2 to 50 parts by mass, and further more preferably 5 to 50 parts by mass.

[(iii) Constituent Unit Derived from Other Monomer (a3)]

In the present invention, the hydrolyzable copolymer (A) preferably has (iii) a constituent unit derived from any other monomer (a3).

With no specific limitation, the other monomer (a3) may be any monomer copolymerizable with the monomer (a1) and the monomer (a2). Above all, the other monomer (a3) is preferably an ethylenically unsaturated compound.

Examples of the other monomer (a3) include:

an alkyl (meth)acrylate or an aryl (meth)acrylate, such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, pentyl (meth)acrylate, hexyl (meth)acrylate, cyclohexyl (meth)acrylate, n-octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, phenyl (meth)acrylate, and benzyl (meth)acrylate;

an alkoxyalkyl (meth)acrylate, such as 2-methoxyethyl (meth)acrylate, 2-ethoxyethyl (meth)acrylate, 4-methoxybutyl (meth)acrylate, 3-methoxy-n-propyl (meth)acrylate, 2-propoxyethyl (meth)acrylate, 2-butoxyethyl (meth)acrylate, isobutoxybutyldiglycol (meth)acrylate, 2-phenoxyethyl (meth)acrylate, methoxypolyethylene glycol (meth)acrylate, ethoxypolyethylene glycol (meth)acrylate, butoxypolyethylene glycol (meth)acrylate, and phenoxypolyethylene glycol (meth)acrylate;

a hydroxyalkyl (meth)acrylate, such as hydroxymethyl (meth)acrylate, 2-hydroxyethyl (meth)acrylate, 2-hydroxypropyl (meth)acrylate, 4-hydroxybutyl (meth)acrylate, and 2-hydroxy-3-phenoxypropyl (meth)acrylate;

glycidyl (meth)acrylate; and a vinyl compound, such as styrene, α-methylstyrene, vinyl acetate, vinyl benzoate, vinyltoluene, acrylonitrile, vinylpyridine, vinylpyrrolidone, and vinyl chloride. These monomers may be used alone or as a combination of two or more kinds thereof.

The hydrolyzable copolymer (A) can be produced, for example, in the following procedure.

In the case where the hydrolyzable group-containing monomer (a1) contains the monomer (a12) or (a13), for example, the monomer can be synthesized according to a known method of stirring an inorganic metal compound (preferably a copper or zinc oxide, hydroxide or chloride) and an organic acid such as methacrylic acid or acrylic acid or an ester thereof in the presence of an organic solvent or water, with heating at a temperature not higher than the decomposition temperature of the metal salt.

More specifically, first, a mixture prepared by mixing a solvent and a metal component such as zinc oxide is stirred with heating at around 50 to 80° C., and a mixture of an organic acid such as methacrylic acid or acrylic acid or an ester thereof, and water is dropwise added thereto, and further stirred to give a monomer (a12) or (a13).

Next, a solvent is put into a newly prepared reactor and heated at around 80 to 120° C., and a mixture of the monomer (a1), the polyorganosiloxane block-containing monomer (a2), optionally any other monomer (a3), a polymerization initiator, a chain transfer agent and a solvent is dropwise added thereto, and polymerization is carried out to provide the polyorganosiloxane block-containing hydrolyzable copolymer (A).

The polymerization initiator usable in producing the hydrolyzable copolymer (A) is not specifically limited, and various radical polymerization initiators can be used. Specific examples thereof include benzoyl peroxide, hydrogen peroxide, cumene hydroperoxide, tert-butyl hydroperoxide, potassium persulfate, sodium persulfate, 2,2'-azobis(isobutyronitrile) (AIBN), 2,2'-azobis(2-methylbutyronitrile) (AMBN), 2,2'-azobis(2,4-dimethylvaleronitrile) (ADVN), and tert-butyl peroctoate (TBPO). The polymerization initiators may be used alone or as a combination of two or more kinds thereof. The radical polymerization initiator may be added into the reaction system only at the start of the reaction, or may be added into the reaction system both at the start of the reaction and in the course of the reaction.

The amount of the polymerization initiator used in the production of the silyl ester copolymer (A) is preferably from 0.1 to 20 parts by mass per 100 parts by mass in total of the monomers.

The chain transfer agent that can be used for the production of the hydrolyzable copolymer (A) is not particularly limited, and examples thereof include α-methylstyrene dimer, thioglycolic acid, diterpene, terpinolene, γ-terpinene; mercaptans, such as tert-dodecylmercaptan and n-dodecylmercaptan; a halide, such as carbon tetrachloride, methylene chloride, bromoform, and bromotrichloroethane; and a secondary alcohol, such as isopropanol and glycerol. The chain transfer agents may be used alone or as a combination of two or more kinds thereof.

In the case where the chain transfer agent is used in the production of the hydrolyzable copolymer (A), the amount thereof used is preferably from 0.1 to 5 parts by mass per 100 parts by mass in total of the monomers.

Examples of the solvent that can be used for the production of the hydrolyzable copolymer (A) include an aromatic-based solvent, such as toluene, xylene, and mesitylene; an alcohol, such as propanol, butanol, propylene glycol monomethyl ether, and dipropylene glycol monomethyl ether; a ketone, such as methyl ethyl ketone, methyl isobutyl ketone, and methyl amyl ketone; an ester, such as ethyl acetate and butyl acetate; and water.

Preferably, the number-average molecular weight (Mn) and the weight-average molecular weight (Mw) of the hydrolyzable copolymer (A) are appropriately controlled in consideration of the viscosity and the storage stability of the antifouling coating composition and of the elution rate (renewability) of the resultant antifouling coating film.

The number-average molecular weight (Mn) is preferably 1,000 to 100,000, more preferably 1,500 to 30,000. The weight-average molecular weight (Mw) is preferably 2,000 to 200,000, more preferably 3,000 to 60,000.

The number-average molecular weight (Mn) and the weight-average molecular weight (Mw) can be obtained through measurement by gel permeation chromatography and converting based on the standard polystyrene.

One alone of the hydrolyzable copolymer (A) may be used, or two or more kinds thereof may be used in combination.

The content of the hydrolyzable copolymer (A) in the antifouling coating composition is, from the viewpoint of bettering the coating workability with the antifouling coating composition and bettering the antifouling performance of the antifouling coating film, preferably 5% by mass or more in the antifouling coating composition, more preferably 10% by mass or more, and is preferably 99% by mass or less, more preferably 95% by mass or less, even more preferably 90% by mass or less, and further more preferably 88% by mass or less.

In the present invention, in the case where the antifouling coating composition contains two or more kinds of hydrolyzable copolymers (A), the aforementioned content is a preferred range of the total content of the hydrolyzable copolymers (A), and the same shall apply to the constituent components to be mentioned hereinafter.

In the case where the hydrolyzable copolymer (A) contains a constituent unit derived from a silyl ester group-containing monomer, preferably the monomer (a11), the content of the hydrolyzable copolymer (A) based on the solid content of the antifouling coating composition is preferably 5 to 60% by mass, more preferably 10 to 50% by mass, even more preferably 12 to 35% by mass. In the case where the hydrolyzable copolymer (A) has a constituent unit derived from a metal ester group-containing monomer, preferably the monomer (a12) and/or the monomer (a13), the content of the hydrolyzable copolymer (A) based on the solid content of the antifouling coating composition is preferably 10 to 99% by mass, more preferably 15 to 95% by mass, even more preferably 20 to 90% by mass, and further more preferably 25 to 88% by mass.

In the present invention, for enhancing the slime resistance of the antifouling coating film owing to the polyorganosiloxane contained in the hydrolyzable copolymer (A), preferably, the content ratio of the hydrolyzable copolymer (A) in the antifouling coating film is increased.

In the present invention, in the case where two or more kinds of hydrolyzable copolymers (A) are contained, the aforementioned content is a preferred range of the total content of the hydrolyzable copolymers (A), and the same shall apply to the constituent components to be mentioned hereinafter.

<Medetomidine (B)>

The antifouling coating composition of the present invention contains medetomidine (B) for the purpose of imparting a high antifouling performance particularly against barnacles to the formed antifouling coating film.

Medetomidine (B) is (+/−)-4-[1-(2,3-dimethylphenyl)ethyl]-1H-imidazole, and is represented by the following formula (3).

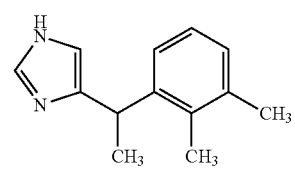

(3)

Medetomidine (B) has optical isomerism, and only one isomer thereof or a mixture of isomers at an arbitrary ratio may be used. As a part or the whole of the medetomidine (B), an imidazolium salt or an adduct to metal thereof may be used, or an adduct to metal or an imidazolium salt may be formed in the antifouling coating composition or the antifouling coating film in the present invention.

The content of the medetomidine (B) in the antifouling coating composition of the present invention is, from the viewpoint of imparting a good antifouling performance to the formed antifouling coating film, preferably 0.01 to 5% by mass in the antifouling coating composition, more preferably 0.04 to 1% by mass, and is preferably 0.01 to 5% by mass based on the solid content of the antifouling coating composition, preferably 0.03 to 3% by mass, more preferably 0.05 to 1% by mass, and even more preferably 0.05 to 0.5% by mass.

In the present invention, when the content ratio of the polyorganosiloxane block-containing hydrolyzable copolymer (A) is higher, the characteristics of the hydrolyzable copolymer (A) can be exhibited more, so that the slime resistance of the antifouling coating film can be extremely excellent. On the contrary, in the case where the content ratio of the hydrolyzable copolymer (A) is high, the coating film strength tends to lower, and as a result, organism species having a high mechanical adhesion strength such as barnacles may readily intrude their pedestal into the coating film, therefore as a result, the antifouling coating film tends to be fouled. On the other hand, medetomidine (B) can exhibit an extremely high-level resistance to barnacles even though an extremely small amount thereof is added. From this, the combination of the polyorganosiloxane block-containing hydrolyzable copolymer (A) and the medetomidine (B) in the present invention complementarily or synergistically draw forth the mutual advantages of the two, and can provide an antifouling coating composition capable of forming an antifouling coating film excellent in both barnacle resistance and slime resistance and having a comprehensively good antifouling performance.

<Other Optional Components>

The antifouling coating composition of the present invention may contain, depending on necessity, zinc oxide (C), a polyester-based polymer (D), a wetting dispersant (E), any other antifouling agent (F), a monocarboxylic acid compound (G), any other pigment (H), any other binder component (I), a dehydrating agent (J), a solvent (K), an anti-sagging agent/anti-settling agent (L), and a plasticizer (M) in addition to the aforementioned components.

The other optional components are described below.

[Zinc Oxide (C)]

Preferably, the antifouling coating composition of the present invention contains zinc oxide (C) for the purpose of improving the water resistance, damage resistance and antifouling performance of the antifouling coating film.

When the antifouling coating composition of the present invention contains zinc oxide, the resistance of the antifouling coating film against barnacles can be excellent for a longer period of time owing to the presumed contribution of the interaction between zinc and medetomidine.

In addition, in particular, in the case where the hydrolyzable group-containing monomer (a1) contains a monomer having a metal ester group represented by the formula (1-2) or (1-3) and where M in each formula is zinc, the negative influence of water permeability derived from polyorganosiloxane blocks could be relieved by the effect of presumed contribution of zinc ion concentration, and the antifouling coating film could be thereby given good water resistance.

In the case where the antifouling coating composition of the present invention contains zinc oxide (C), from the viewpoint of making the antifouling coating film appropriately exhibit water resistance, damage resistance and antifouling performance, the content thereof is preferably 0.1 to 60% by mass based on the solid content of the antifouling coating composition of the present invention, more preferably 1 to 40% by mass, even more preferably 1.5 to 25% by mass.

[Polyester-Based Polymer (D)]

Preferably, the antifouling coating composition of the present invention contains a polyester-based polymer (D) for reducing the viscosity of the antifouling coating composition to improve the coating workability thereof, and for bettering the cracking resistance of the antifouling coating film to thereby make the film exhibit further excellent antifouling performance.

The polyester-based polymer (D) is obtained through reaction of one or more polyalcohols, one or more polycarboxylic acids and/or anhydrides thereof, and optionally any other component, for which any kinds of components may be used in any desired amount, and depending on the combination thereof, the hydroxyl value/acid value and the viscosity of the resultant polymer can be controlled.

Examples of the polyalcohols include propylene glycol, glycerol, ethylene glycol, 1,6-hexanediol, trimethylolpropane (TMP), pentaerythritol, sorbitol; and polyalkylene glycol such as diethylene glycol. From easy availability of raw materials, propylene glycol, glycerol and TMP are preferred. Two or more kinds of such polyalcohols may be used in combination.

Examples of the polycarboxylic acid and/or anhydride thereof include malonic acid, maleic acid, fumaric acid, glutaric acid, adipic acid, pimellic acid, suberic acid, azelaic acid, sebacic acid, 1,9-nonamethylenedicarboxylic acid, 1,10-decamethylenedicarboxylic acid, 1,11-undecamethylenedicarboxylic acid, 1,12-dodecamethylene dicarboxylic acid, cyclohexanedicarboxylic acid, decahydronaphthalenedicarboxylic acid, terephthalic acid, isophthalic acid, phthalic acid, hexahydrophthalic acid, succinic acid, and anhydrides thereof. Phthalic anhydride and hexahydrophthalic anhydride are preferred.

From the viewpoint of the storage stability of the antifouling coating composition and the antifouling performance of the antifouling coating film and from the viewpoint of imparting suitable hydrophilicity to the film, the hydroxyl value of the solid content of the polyester-based polymer (D) is preferably 50 to 150 mgKOH/g, more preferably 80 to 120 mgKOH/g.

Dissolved in a solvent, the polyester-based polymer (D) may be used as a solution thereof (hereinafter this may be referred to as a polyester-based polymer solution). As the solvent, those mentioned for the solvent (K) hereinafter may be used.

From the viewpoint of reducing the viscosity of the antifouling coating composition, the polyester-based polymer solution preferably has 3,000 mPa·s or less at 25° C., more preferably 1,000 mPa·s or less.

The polyester-based polymer solution may contain unreacted raw materials.

Examples of the polyester-based polymer (D) include Teslac 2474 (polyester polyol, hydroxyl value 121 mgKOH/g) and Teslac 2462 both manufactured by Hitachi Chemical Co., Ltd.

In the present invention, the polyester-based polymer (D) is used for bettering the cracking resistance of the antifouling coating film and for exhibiting further excellent antifouling performance. In the present invention, the cracking resistance of the coating film is prone to somewhat lower especially owing to the characteristics of the polyorganosiloxane block-containing hydrolyzable copolymer (A), and therefore, the coating film properties can be improved by additionally using any other binder (I). On the other hand, these may often lower the antifouling performance of the antifouling coating film. However, using the aforementioned polyester-based polymer (D), the cracking resistance of the antifouling coating film can be improved without worsening the antifouling performance of the antifouling coating film.

In the case where the antifouling coating composition of the present invention contains the polyester-based polymer (D), the content thereof is preferably 0.1 to 40% by mass based on the solid content of the antifouling coating composition, more preferably 0.5 to 30% by mass, even more preferably 1.0 to 20% by mass.

One kind alone of the polyester-based polymer (D) may be used, or two or more kinds thereof may be used in combination.

[Wetting Dispersant (E)]

In the case where the antifouling coating composition of the present invention contains zinc oxide (C), any other antifouling agent (F) to be mentioned below and pigment (H) to be mentioned below, the antifouling coating composition of the present invention may contain a wetting dispersant (E) for the purpose of improving the dispersibility of the added components.

A wetting dispersant is generally used for improving the efficiency of pigment dispersion in producing coating paints. Especially in the antifouling coating composition of the present invention, the polyorganosiloxane block-containing hydrolyzable copolymer (A) having a low surface free energy is used as a binder, and therefore a pigment and an antifouling agent having a high polarity would be poorly wetted on the surfaces thereof and uniform dispersion thereof could not be sufficiently attained. As a result, the coating film properties such as cracking resistance may lower in forming the antifouling coating film. Consequently, in the present invention, using the wetting dispersant (E) along with the other components is effective for making the antifouling coating film have good physical properties.

The wetting dispersant (E) includes various known organic or inorganic pigment dispersants. Specific examples thereof include aliphatic amines or polyfunctional organic acids (e.g., Disperbyk 101 (salt of long-chain polyaminoamide and polar acid ester) and Disperbyk 108 (hydroxy group-containing carboxylate) both manufactured by BYK Japan KK). One kind alone of the wetting dispersant (E) may be used, or two or more kinds thereof may be used in combination.

In the case where the antifouling coating composition of the present invention contains the wetting dispersant (E), from the viewpoint of making the antifouling coating film have good cracking resistance and water resistance, the content thereof is preferably 0.01 to 10% by mass based on the solid content of the antifouling coating composition of the present invention, more preferably 0.1 to 5% by mass.

[Other Antifouling Agent (F)]

The antifouling coating composition of the present invention may further contain any other antifouling agent (F) than medetomidine (B) for further improving the antifouling performance of the antifouling coating film formed of the antifouling coating composition of the present invention.

Examples of the other antifouling agent (F) include cuprous oxide, copper oxide, copper (metal copper), copper thiocyanate (also called copper rhodanide), and metal pyrithiones such as copper pyrithione and zinc pyrithione; 4,5-dichloro-2-n-octyl-4-isothiazolin-3-one (also called DCOIT), 4-bromo-2-(4-chlorophenyl)-5-(trifluoromethyl)-1H-pyrrole-3-carbonitrile (also called tralopyril), a boranenitride-based base adduct such as pyridine triphenylborane and 4-isopropylpyridine diphenylmethyl borane, N,N-dimethyl-N'-(3,4-dichlorophenyl)urea (also called Diuron), N-(2,4,6-trichlorophenyl)maleimide, 2,4,5,6-tetrachloroisophthalonitrile, 2-methylthio-4-tert-butylamino-6-cyclopropylamino-1,3,5-triazine (also called Cybutryne), bisdimethyldithiocarbamoyl zinc ethylenebisdithiocarbamate (also called polycarbamate), chloromethyl-n-octyl disulfide, N,N'-dimethyl-N'-phenyl-(N-fluorodichloromethylthio)sulfamide (also called Dichlofluanid), tetraalkylthiuram disulfide (also called TMTD), zinc dimethyl dithiocarbamate (also called Ziram), zinc ethylene bisdithiocarbamate, 2,3-dichloro-N-(2',6'-diethylphenyl)maleimide, and 2,3-dichloro-N-(2'-ethyl-6'-methylphenyl)maleimide; and among these, cuprous oxide, metal pyrithiones such as copper pyrithione and zinc pyrithione, as well as DCOIT, Tralopyril, and pyridine triphenylborane are preferably contained.

Among these, cuprous oxide having an average particle size of approximately 0.1 to 30 μm is preferred since it can exhibit long-term antifouling performance; and cuprous oxide surface-treated with any of glycerol, stearic acid, lauric acid, sucrose, lecithin or mineral oil is preferred from the viewpoint of long-term stability in storage. Examples of commercial products of such cuprous oxide include NC-301 (manufactured by NC TECH Co., Ltd.), NC-803 (manufactured by NC TECH Co., Ltd.), Red Copp97N Premium (manufactured by AMERICAN CHEMET Co.), Purple Copp (manufactured by AMERICAN CHEMET Co.), and LoLoTint97 (manufactured by AMERICAN CHEMET Co.).

One kind alone of the antifouling agent (F) may be used or two or more kinds thereof may be used in combination.

In the case where the antifouling coating composition of the present invention contains the other antifouling agent (F), from the viewpoint of making the formed antifouling coating film exhibit good antifouling performance, the content thereof is preferably 0.1 to 80% by mass based on the solid content of the coating composition.

[Monocarboxylic Acid Compound (G)]

The antifouling coating composition of the present invention may contain a monocarboxylic acid compound (G).

In the present invention, the monocarboxylic acid compound (G) enhances the renewability of the formed antifouling coating film from the surface thereof in water. In the case where the antifouling coating film contains an antifouling agent, the discharge thereof to water is accelerated by the monocarboxylic acid compound (G) to facilitate the enhancement of the antifouling performance, and furthermore the monocarboxylic acid compound (G) can provide appropriate water resistance to the antifouling coating film.

As the monocarboxylic acid compound (G), assuming that the monocarboxylic acid compound is represented by R—COOH, for example, R preferably represents a saturated or unsaturated aliphatic hydrocarbon group having 10 to 40 carbon atoms, a saturated or unsaturated alicyclic hydrocarbon group having 3 to 40 carbon atoms, or a group obtained by allowing these groups to have a substituent.

Specifically, preferred examples thereof include abietic acid, neoabietic acid, dehydroabietic acid, palustric acid, isopimaric acid, pimaric acid, trimethylisobutenylcyclohexenecarboxylic acid, versatic acid, stearic acid, and naphthenic acid.

A rosin compound containing abietic acid, palustric acid, isopimaric acid, and the like as a major component is also preferred. Examples of the rosin compound include rosin, such as gum rosin, wood rosin, and tall oil rosin, a rosin derivative, such as hydrogenated rosin, disproportionated rosin, and a rosin metal salt, and pine tar.

Examples of the trimethylisobutenylcyclohexenecarboxylic acid include a reaction product of 2,6-dimethylocta-2,4,6-triene and methacrylic acid, which contains 1,2,3-trimethyl-5-(2-methylprop-1-en-1-yl)cyclohexa-3-ene-1-carboxylic acid and 1,4,5-trimethyl-2-(2-methylprop-1-en-1-yl)cyclohexa-3-ene-1-carboxylic acid as a major component (85% by mass or more).

In the present invention, a part or all of the monocarboxylic acid compound (G) may form a metal ester. Examples of the metal ester include a zinc ester and a copper ester, which may be formed in advance before the production of the antifouling coating composition or may be formed through reaction with the other component in the production of the antifouling coating composition.

One kind alone of the monocarboxylic acid compound (G) and/or a metal ester thereof may be used or two or more kinds thereof may be used in combination.

In the case where the antifouling coating composition of the present invention contains a monocarboxylic acid compound (G) and/or a metal ester thereof, from the viewpoint of the coating workability with the antifouling coating composition or of the water resistance of the antifouling coating film, the content thereof based on the solid content of the coating composition is preferably 0.1 to 50% by mass, and more preferably 1 to 20% by mass.

[Other Pigment (H)]

The antifouling coating composition of the present invention may contain any other pigment (H) than zinc oxide and the antifouling agent, for the purpose of coloring of the coating film and concealing an undercoat and for the purpose of controlling the coating film to have appropriate strength.

Examples of the other pigment (H) include an extender pigment, such as talc, mica, clay, potassium feldspar, calcium carbonate, kaolin, alumina white, white carbon, aluminum hydroxide, magnesium carbonate, barium carbonate, barium sulfate, calcium sulfate, and zinc sulfide, Bengal red (red iron oxide), titanium white (titanium oxide), yellow iron oxide, carbon black, naphthol red, and phthalocyanine blue, and among these, talc is preferably contained. One kind alone of the pigments may be used or two or more kinds thereof may be used in combination.

In the case where the antifouling coating composition of the present invention contains the other pigment (H), the preferred content thereof may be determined depending on the desired concealing performance of the formed antifouling coating film and on the desired viscosity of the antifouling coating composition, and is preferably 1 to 40% by mass based on the solid content of the coating composition.

[Other Binder Component (I)]

The antifouling coating composition of the present invention may contain any other binder component (I) than the polyorganosiloxane block-containing hydrolyzable copolymer (A) and the polyester resin (D), for the purpose of imparting water resistance, crack resistance and strength to the formed antifouling coating film.

The other binder component (I) does not have a hydrolyzable group. This excludes the aforementioned polyester resin (D).

Examples of the other binder component (I) include an acrylic-based copolymer (acrylic resin), a vinyl-based copolymer, a chlorinated paraffin, an n-paraffin, a terpene phenol resin, a polyvinyl ethyl ether, a petroleum resin, and a ketone resin. Among these, an acrylic-based copolymer, a vinyl-based copolymer, a chlorinated paraffin and a petroleum resin are preferred. The acrylic-based copolymer and the vinyl-based copolymer used may be obtained through polymerization of the compound described for the other monomer (a3).

One kind alone of the other binder component (I) may be used or two or more kinds thereof may be used in combination.

The chlorinated paraffin may have any of a linear or branched molecular structure, and may be liquid or solid (for example, powdery) at room temperature (e.g., 23° C.).

Preferably, the chlorinated paraffin has 8 to 30 carbon atoms, more preferably 10 to 26 carbon atoms on average in one molecule. The antifouling coating composition containing such a chlorinated paraffin can form an antifouling coating film that may hardly crack or peel. When the average carbon number is less than 8, the effect of preventing the antifouling coating film from cracking will be insufficient, on the other hand, however, when the average carbon number is more than 30, the hydrolyzability (renewability, self-polishing property) of the antifouling coating film will be poor and, as a result, the antifouling performance thereof will worsen.

The viscosity of the chlorinated paraffin (measurement temperature 250C) is preferably 1 poise or more, more preferably 1.2 poise or more, and the specific gravity (250C) thereof is preferably 1.05 to 1.80 $g/cm^3$, more preferably 1.10 to 1.70 $g/cm^3$.

The chlorination degree (chlorine content) of the chlorinated paraffin is generally 35 to 70 parts by mass based on the chlorinated paraffin as 100 parts by mass, preferably 35 to 65 parts by mass. The antifouling coating composition containing a chlorinated paraffin having such a chlorination degree can form a coating film that may hardly crack (break) or peel.

The petroleum resin includes C5-base, C9-base, styrene-base and dichloropentadiene-base resins, and hydrogenated products thereof.

Commercial products may be used for the other binder component (I), and examples thereof include "Dianal BR-106" manufactured by Mitsubishi Rayon Co., Ltd., for the acrylic-based copolymer (acrylic resin); "Toyoparax A-40, A-50, A-70, A-145, A-150 and 150" manufactured by Tosoh Corporation, for the chlorinated paraffin; and "Quintone 1500" and "Quintone 1700" manufactured by Zeon Corporation for the petroleum resin.

In the case where the antifouling coating composition of the present invention contains the other binder component (I), the content thereof is preferably 0.1 to 10% by mass based on the solid content of the antifouling coating composition.

[Dehydrating Agent (J)]

The antifouling coating composition of the present invention may contain a dehydrating agent (J) for the purpose of enhancing the storage stability thereof. Examples of the dehydrating agent (J) include synthetic zeolite, anhydrite, and hemihydrate gypsum (also called calcined gypsum) as an inorganic dehydrating agent; and alkoxysilanes such as tetramethoxysilane, tetraethoxysilane, tetrabutoxysilane, tetraphenoxysilane, methyltriethoxysilane, dimethyldiethoxysilane, and trimethylethoxysilane, or condensation products thereof, and alkyl orthoformates such as methyl orthoformate and ethyl orthoformate, as an organic dehydrating agent. One kind alone of the dehydrating agent (J) may be used, or two or more kinds thereof may be used in combination.

In the case where the antifouling coating composition of the present invention contains the dehydrating agent (J), the content thereof is preferably 0.1 to 20% by mass based on the solid content of the coating composition, and more preferably 0.2 to 15% by mass.

[Solvent (K)]

The antifouling coating composition of the present invention may contain a solvent (K) such as water or an organic solvent for the purpose of controlling the viscosity of the antifouling coating composition. The antifouling coating composition of the present invention may contain the solvent used in preparing the hydrolyzable copolymer (A), or may contain the solvent added in mixing the hydrolyzable copolymer (A) and the other optional component, as the solvent (K). The solvent (K) is preferably an organic solvent.

The organic solvent include aromatic organic solvents such as xylene, toluene and ethylbenzene; ketones such as methyl ethyl ketone, methyl isobutyl ketone, and cyclohexanone; aliphatic monoalcohols (having 1 to 10, preferably approximately 2 to 5 carbon atoms) such as ethanol, isopropyl alcohol, n-butanol, isobutanol, and propylene glycol monomethyl ether; and ester solvents such as ethyl acetate and butyl acetate. One kind alone of the solvent (K) may be used or two or more kinds thereof may be used in combination.

In the case where the antifouling coating composition of the present invention contains the solvent (K), the preferred content thereof may be determined depending on the desired viscosity corresponding to the coating method of the coating composition, and, in general, the content thereof is preferably 0 to 50% by mass in the coating composition. In the case where the content thereof is too large, deterioration of the anti-sagging performance may occur.

[Anti-Sagging Agent/Anti-Settling Agent (L)]

The antifouling coating composition of the present invention may contain an anti-sagging agent/anti-settling agent (L) for the purpose of controlling the viscosity of the coating composition.

Examples of the anti-sagging agent/anti-settling agent (L) include organoclay-based wax (such as stearate salts, lecithin salts, and alkyl sulfonates of Al, Ca, and Zn), organic-based wax (such as polyethylene wax, oxidized polyethylene wax, amide wax, polyamide wax, and hydrogenated castor oil wax), a mixture of organoclay-based wax and organic-based wax, and synthetic fine powder silica.

The anti-sagging agent/anti-settling agent (L) used may be a commercially available product, and examples thereof include "Disparlon 305", "Disparlon 4200-20", "Disparlon A630-20X", and "Disparlon 6900-20X" all manufactured by Kusumoto Chemicals, Ltd., and "A-S-A D-120", manufactured by Itoh Oil Chemicals, Co., Ltd.

One kind alone of the anti-sagging agent/anti-settling agent (L) may be used or two or more kinds thereof may be used in combination.

In the case where the antifouling coating composition of the present invention contains the anti-sagging agent/anti-settling agent (L), the content thereof is preferably 0.01 to 10% by mass based on the solid content of the coating composition, and more preferably 0.1 to 3% by mass.

[Plasticizer (M)]

The antifouling coating composition of the present invention may contain a plasticizer (M) for the purpose of imparting plasticity to the antifouling coating film.

Examples of the plasticizer (M) include tricresyl phosphate (TCP), dioctyl phthalate (DOP), and diisodecyl phthalate (DIDP). One kind alone of the plasticizer may be used or two or more kinds thereof may be used in combination.

In the case where the antifouling coating composition of the present invention contains the plasticizer (M), the content thereof is preferably 0.1 to 10% by mass based on the solid content of the coating composition, and more preferably 0.5 to 5% by mass. In the case where the content of the plasticizer (M) is in the range, the plasticity of the antifouling coating film can be kept good.

[Production Method of Antifouling Coating Composition]

The antifouling coating composition of the present invention can be prepared by the same equipment, procedures, and the like as for the known ordinary antifouling paint. Specifically, the antifouling coating composition may be produced by preparing the hydrolyzable copolymer (A), and then adding medetomidine (B) and the other optional additives to the solution of the polymer at one time or sequentially, and stirring and mixing them.

[Antifouling Coating Film and Substrate with Antifouling Coating Film, Method for Producing Same, and Antifouling Method]

The antifouling coating film of the present invention is formed by drying the antifouling coating composition mentioned above.

The antifouling method of the present invention includes using the aforementioned antifouling coating film, and includes forming an antifouling coating film on various substrates with the antifouling coating composition of the present invention, to thereby prevent the substrates from being fouled.

Specifically, regarding the method of forming the antifouling coating film, for example, the antifouling coating composition of the present invention is applied onto a coating film or a substrate and dried thereon to form an antifouling coating film.

Examples of the method of applying the antifouling coating composition of the present invention include known methods using a brush, a roller or a spray.

The antifouling coating composition applied according to the aforementioned method may be dried, for example, by allowing to stand under a condition of 25° C. for a period of preferably approximately 0.5 to 14 days, more preferably approximately 1 to 7 days to give a coating film. The antifouling coating composition may be dried while blowing the air under heating.

The thickness of the antifouling coating film after drying may be arbitrarily selected corresponding to the renewal rate of the antifouling coating film and on the period of use thereof, and is preferably, for example, approximately 30 to 1,000 μm. Examples of the method of producing the antifouling coating film having the thickness include a method of applying the coating composition once or plural times to a thickness per one time applying of preferably 10 to 300 μm, and more preferably 30 to 200 μm.

The substrate with an antifouling coating film according to the present invention is one coated with an antifouling coating film formed with the antifouling coating composition, and has the antifouling coating film on a substrate.

The substrate with an antifouling coating film of the present invention may be produced by forming the antifouling coating film on a substrate according to the aforementioned method.

The method for producing the substrate with an antifouling coating film according to the present invention is not particularly limited, and the substrate with an antifouling coating film can be obtained, for example, by a production method including: (I) a step of providing an applied body or an impregnated body by applying the antifouling coating composition of the present invention on a substrate or impregnating a substrate with the antifouling coating composition of the present invention; and (II) a step of drying the applied body or the impregnated body.

In the step (I), the method for applying the coating composition on the substrate may be the aforementioned coating method. The method for impregnating is not particularly limited, and may be performed by immersing the substrate in the coating composition in an amount that is sufficient for the impregnation. The method for drying the applied body or the impregnated body is not particularly limited, and the body may be dried in the similar manner as in the production of the antifouling coating film.

The substrate with an antifouling coating film of the present invention can also be obtained by a method including: (I') a step of forming a coating film by drying the antifouling coating composition of the present invention; and (II') a step of attaching the coating film to a substrate.

In the step (I'), the method for forming the coating film is not particularly limited, and the coating film can be produced in the similar method as in the production of the antifouling coating film.

In the step (II'), the method for attaching the coating film to a substrate is not particularly limited, and the coating film can be attached, for example, by the method described in JP 2013-129724 A.

The antifouling coating composition of the present invention can be utilized for retaining the antifouling performance of the substrate for a prolonged period of time in a wide range of industrial fields including ships, fishery, marine structures, and the like. Examples of the substrate include a ship (such as an outside shell of a ship's hull of a large scale steel-hulled ship, e.g., a container ship and a tanker, a fishing boat, an FRP boat, a wooden boat, a yacht, and the like, and a newly built ship and a repaired ship), a fishing material (such as a rope, a fishing net, a fishing gear, a float, and a buoy), and a marine structure, such as a mega-float. Among these, the substrate is preferably selected from the group consisting of a ship, an underwater structure, and a fishing gear, is more preferably selected from the group consisting of a ship and an underwater structure, and is further preferably a ship.

The substrate, on which the antifouling coating composition of the present invention is to be formed on the surface thereof, may have a surface having been treated with other treating agents, such as a rust inhibitor, a surface having been coated with a certain coating film, such as a primer, or a surface having been coated with the antifouling coating composition of the present invention. The type of the coating film to which the antifouling coating film of the present invention directly contacts is not particularly limited.

EXAMPLES

The present invention will be described more specifically with reference to examples below, but the present invention is not whatsoever limited to the examples. In the following, the "part" means part by mass beyond the scope of the present invention.

The "solid contents" of the components used in the examples each mean a component obtained from removal of the volatile component contained as a solvent from the component, and mean a component that is obtained by drying the component in a hot air dryer at 108° C. for 3 hours.

Production of Polyorganosiloxane Block-Containing Hydrolyzable Copolymer (A)

Production Example 1: Production of Hydrolyzable Copolymer Solution (A-1)

43 parts by mass of xylene, 10 parts by mass of triisopropylsilyl methacrylate and 2 parts by mass of FM-0711 (one-terminal methacrylate-modified organopolysiloxane, average molecular weight Mn=1,000, manufactured by JNC Corporation) were put into a reaction vessel equipped with a stirrer, a condenser, a thermometer, a dropping device, a nitrogen introducing tube, and a heating and cooling jacket, and heated with stirring under a temperature condition of 80±5° C. in a nitrogen stream atmosphere. While kept at the temperature, a mixture of 40 parts by mass of triisopropylsilyl methacrylate, 8 parts by mass of FM-0711 (one-terminal methacrylate-modified organopolysiloxane, average molecular weight Mn=1,000, manufactured by JNC Corporation), 20 parts by mass of 2-methoxyethyl methacrylate, 20 parts by mass of methyl methacrylate and 1.1 parts by mass of 2,2'-azobisisobutyronitrile was dropwise added to the reaction vessel through the dropping device, taking 2 hours. Subsequently, this was stirred at the temperature for 2 hours, and then 0.4 parts by mass of 2,2'-azobisisobutyronitrile was added thereto and heated up to 105° C., taking 3 hours, and thereafter 24 parts by mass of xylene was added to give a colorless transparent hydrolyzable copolymer solution (A-1).

Production Examples 2 to 5: Production of Hydrolyzable Copolymer Solutions (A-2) to (A-5)

Hydrolyzable copolymer solutions (A-2) to (A-5) were produced in the same manner as in Production Example 1 except that the charging ratio of the monomer mixture used in Production Example 1 and the kind and the amount of the polymerization initiator used in dropwise adding were changed as in Table 1.

The constitution of the monomer mixture used, and the physical properties of the hydrolyzable copolymer solutions (A-2) to (A-5) and the copolymers contained therein, as measured according to the methods described below, are shown in Table 1.

TABLE 1

| | | | Production Example 1 (A-1) | Production Example 2 (A-2) | Production Example 3 (A-3) | Production Example 4 (A-4) | Production Example 5 (A-5) |
|---|---|---|---|---|---|---|---|
| Monomer Mixture | (a11) | Triisopropylsilyl methacrylate | 50.0 | 50.0 | 50.0 | 60.0 | 60.0 |
| | | Triisopropylsilyl acrylate | | | | | |
| | (a21) | FM-0711 *1 | 10.0 | 20.0 | | | |
| | (a23) | FM-0721 *2 | | | 10.0 | | |
| | | KF-2001 *3 | | | | 10.0 | |
| | (a3) | 2-Methoxyethyl methacrylate | 20.0 | 20.0 | 20.0 | 25.0 | 25.0 |
| | | Methyl methacrylate | 20.0 | 10.0 | 20.0 | 5.0 | 10.0 |
| | | Butyl acrylate | | | | | 5.0 |
| | | Total | 100.0 | 100.0 | 100.0 | 100.0 | 100.0 |
| Initiator (dropwise added amount) | | 2,2'-Azobisisobutyronitrile | 1.1 | 1.8 | 1.0 | | 0.6 |
| | | 2,2'-Azobis(2-methylbutyronitrile) | | | | 2.0 | |
| Physical Properties | | Solid content (mass %) | 59.2 | 59.1 | 59.7 | 59.2 | 60.3 |
| | | Viscosity (mPa · s/25° C.) | 1,839 | 725 | 2,611 | 709 | 2,386 |
| | | Number-average molecular weight (Mn) | 7,900 | 6,000 | 8,500 | 4,600 | 8,700 |
| | | Weight-average molecular weight (Mw) | 36,400 | 39,000 | 36,800 | 38,500 | 37,400 |

The components in Table 1 are as follows.
*1 FM-0711: one-terminal methacryloyloxyalkyl-modified organopolysiloxane, average molecular weight Mn = 1,000, manufactured by JNC Corporation
*2 FM-0721: one-terminal methacryloyloxyalkyl-modified organopolysiloxane, average molecular weight Mn = 5,000, manufactured by JNC Corporation
*3 KF-2001: side chain-mercaptoalkyl-modified organopolysiloxane, functional group equivalent = 1,900 g/mol, manufactured by Shin-Etsu Chemical Co., Ltd.

Measurement methods of the viscosity of the resultant polymer solutions (A-1) to (A-5), and the number-average molecular weight (Mn) and the weight-average molecular weight (Mw) of the polymers contained in the solutions are as mentioned below.

<Viscosity of Polymer Solution>

The viscosity at 25° C. of the polymer solution was measured using an E-type viscometer (manufactured by Toki Sangyo Co., Ltd.).

<Measurement of Number-Average Molecular Weight (Mn) and Weight-Average Molecular Weight (Mw) of Polymer>

The number-average molecular weight (Mn) and the weight-average molecular weight (Mw) were measured through GPC (gel permeation chromatography) under the condition mentioned below.

GPC Condition
Apparatus: HLC-8120GPC, manufactured by Tosoh Corporation
Columns: Super H2000+H4000, manufactured by Tosoh Corporation, 6 mm (inner diameter), each 15 cm (length)
Eluent: tetrahydrofuran (THF)
Flow Rate: 0.500 ml/min
Detector: RI
Column thermostat chamber temperature: 40° C.
Standard Material: polystyrene
Sample Preparation Method: A small amount of calcium chloride was added to the polymer solution prepared in each Production Example for dehydration, then filtered through a membrane filter, and the filtered solution was a sample for GPC measurement.

Production Examples 6 to 11: Hydrolyzable Copolymer Solutions (A-6) to (A-11)

Production Example M1: Production of Metal Ester Group-Containing Monomer Mixture 85.4 parts of PGM (propylene glycol monomethyl ether) and 40.7 parts of zinc oxide were put into a four-neck flask equipped with a condenser, a thermometer, a dropping funnel and a stirrer, and heated up to 75° C. with stirring. Subsequently, a mixture of 43.1 parts of methacrylic acid, 36.1 parts of acrylic acid, and 5 parts of water was added dropwise thereto through the dropping funnel at a constant dropping rate, taking 3 hours. Further, this was stirred for 2 hours, and then 36 parts of PGM was added thereto to give a transparent metal ester group-containing monomer mixture M1. The solid content was 44.8% by mass.

Production Example M2: Production of Metal Ester Group-Containing Monomer Mixture 60 parts of xylene, 13 parts of PGM and 40.7 parts of zinc oxide were put into a four-neck flask equipped with a condenser, a thermometer, a dropping funnel and a stirrer, and heated up to 75° C. with stirring. Subsequently, a mixture of 32.3 parts of methacrylic acid, 27 parts of acrylic acid, 37.7 parts of oleic acid, 2.3 parts of acetic acid and 5.8 parts of propionic acid was added dropwise thereto through the dropping funnel at a constant dropping rate, taking 3 hours. Further, this was stirred for 2 hours, and then 77 parts of xylene and 46 parts of PGM were added thereto to give a metal ester group-containing monomer mixture M2. The solid content was 39.6% by mass.

Production Example 6: Production of Hydrolyzable Copolymer Solution (A-6)

15 parts of PGM, 65 parts of xylene, and 4 parts of ethyl acrylate were put into a four-neck flask equipped with a condenser, a thermometer, a dropping funnel and a stirrer, and heated up to 100° C. with stirring. Subsequently, a transparent mixture of 32.3 parts of methyl methacrylate, 13.9 parts of ethyl acrylate, 40 parts of FM-0711 (product mane, manufactured by JNC Corporation), 21.7 parts of the metal ester group-containing monomer mixture (M1) in Production Example M1, 10 parts of xylene, 1.2 parts of a chain transfer agent (Nofmer MSD (product name) manufactured by NOF Corporation, α-methylstyrene dimer), 2.5 parts of AIBN, and 0.8 parts of 2,2'-azobis(2-methylbutyronitrile) (AMBN) was dropwise added thereto through the dropping funnel at a constant rate, taking 6 hours. After dropwise addition, 0.5 parts of tert-butyl perocotate and 10 parts of xylene were dropwise added, taking 30 minutes, and further stirred for 1 hour and 30 minutes, and thereafter 10.1 parts of xylene was added to give a pale yellow transparent hydrolyzable copolymer solution (A-6) having a heating residue of 45.1% and a Gardner viscosity +U.

When the resultant hydrolyzable copolymer solution was analyzed through GPC (with HLC-8120GPC (product name) manufactured by Tosoh Corporation, eluent: dimethylformamide), the weight-average molecular weight of the copolymer contained in the hydrolyzable polymer solution (A-7) was 8,800.

Production Example 7: Production of Hydrolyzable Copolymer Solution (A-7)

15 parts of PGM, 65 parts of xylene, and 4 parts of ethyl acrylate were put into a four-neck flask equipped with a condenser, a thermometer, a dropping funnel and a stirrer, and heated up to 100° C. with stirring. Subsequently, a transparent mixture of 32.3 parts of methyl methacrylate, 33.9 parts of ethyl acrylate, 20 parts of FM-0711 (product mane, manufactured by JNC Corporation), 21.7 parts of the metal ester group-containing monomer mixture (M1) in Production Example M1, 10 parts of xylene, 1.2 parts of a chain transfer agent (Nofmer MSD (product name) manufactured by NOF Corporation), 2.5 parts of AIBN, and 2 parts of AMBN was dropwise added thereto through the dropping funnel at a constant rate, taking 6 hours. After dropwise addition, 0.5 parts of tert-butyl perocotate and 10 parts of xylene were dropwise added, taking 30 minutes, and further stirred for 1 hour and 30 minutes, and thereafter 10.1 parts of xylene was added to give a pale yellow transparent hydrolyzable copolymer solution (A-7) having a heating residue of 45.4% and a Gardner viscosity +V.

When the resultant hydrolyzable copolymer was analyzed through GPC (with HLC-8120GPC (product name) manufactured by Tosoh Corporation, eluent: dimethylformamide), the weight-average molecular weight of the copolymer contained in the hydrolyzable copolymer solution (A-7) was 7,600.

Production Example 8: Production of Hydrolyzable Copolymer Solution (A-8)

15 parts of PGM, 65 parts of xylene, and 4 parts of ethyl acrylate were put into a four-neck flask equipped with a condenser, a thermometer, a dropping funnel and a stirrer, and heated up to 100° C. with stirring. Subsequently, a transparent mixture of 32.3 parts of methyl methacrylate, 43.9 parts of ethyl acrylate, 10 parts of FM-0721 (product mane, manufactured by JNC Corporation), 21.7 parts of the metal ester group-containing monomer mixture (M1) in Production Example M1, 10 parts of xylene, 1.2 parts of a chain transfer agent (Nofmer MSD (product name) manufactured by NOF Corporation), 2.5 parts of AIBN, and 3 parts of AMBN was dropwise added thereto through the dropping funnel at a constant rate, taking 6 hours. After dropwise addition, 0.5 parts of tert-butyl peroctoate and 10 parts of xylene were dropwise added, taking 30 minutes, and further stirred for 1 hour and 30 minutes, and thereafter 10.1 parts of xylene was added to give a pale yellow transparent hydrolyzable copolymer solution (A-8) having a heating residue of 45.7% and a Gardner viscosity −U.

When the resultant hydrolyzable copolymer was analyzed through GPC (with HLC-8120GPC (product name) manufactured by Tosoh Corporation, eluent: dimethylformamide), the weight-average molecular weight of the copolymer contained in the hydrolyzable copolymer solution (A-8) was 6,800.

Production Example 9: Production of Hydrolyzable Copolymer Solution (A-9)

15 parts of PGM, 65 parts of xylene, and 4 parts of ethyl acrylate were put into a four-neck flask equipped with a condenser, a thermometer, a dropping funnel and a stirrer, and heated up to 100° C. with stirring. Subsequently, a transparent mixture of 32.3 parts of methyl methacrylate, 43.9 parts of ethyl acrylate, 10 parts of FM-7711 (product mane, manufactured by JNC Corporation), 21.7 parts of the metal ester group-containing monomer mixture in Production Example M1, 10 parts of xylene, 2 parts of a chain transfer agent (Nofmer MSD (product name) manufactured by NOF Corporation), 2.5 parts of AIBN, and 7.5 parts of AMBN was dropwise added thereto through the dropping funnel at a constant rate, taking 6 hours. After dropwise addition, 0.5 parts of tert-butyl peroctoate and 10 parts of xylene were dropwise added, taking 30 minutes, and further stirred for 1 hour and 30 minutes, and thereafter 10.1 parts of xylene was added to give a pale yellow transparent hydrolyzable copolymer solution (A-9) having a heating residue of 46.2% and a Gardner viscosity +W.

When the resultant hydrolyzable copolymer was analyzed through GPC (with HLC-8120GPC (product name) manufactured by Tosoh Corporation, eluent: dimethylformamide), the weight-average molecular weight of the copolymer contained in the hydrolyzable copolymer solution (A-9) was 5,400.

Production Example 10: Production of Hydrolyzable Copolymer Solution (A-10)

40 parts of PGM and 31 parts of xylene were put into a four-neck flask equipped with a condenser, a thermometer, a dropping funnel and a stirrer, and heated up to 100° C. with stirring. Subsequently, using a dropping pump, a transparent mixture of 18 parts of methyl methacrylate, 15 parts of ethyl acrylate, 10 parts of FM-7711 (product mane, manufactured by JNC Corporation), 10 parts of FM-7721 (product name, manufactured by JNC Corporation), 30 parts of FM-0711 (product name, manufactured by JNC Corporation), 42.5 parts of the metal ester group-containing monomer mixture in Production Example M2, 10 parts of xylene, 2.5 parts of AIBN, and 4.5 parts of AMBN was dropwise added thereto at a constant rate, taking 6 hours. After dropwise addition, 0.5 parts of tert-butyl peroctoate and 10 parts of xylene were dropwise added, taking 30 minutes, and further stirred for 1 hour and 30 minutes, and thereafter 5.5 parts of xylene was added to give a slightly cloudy hydrolyzable copolymer solution (A-10) having a heating residue of 45.6% and a Gardner viscosity −T.

When the resultant hydrolyzable copolymer was analyzed through GPC (with HLC-8120GPC (product name) manufactured by Tosoh Corporation, eluent: dimethylformamide), the weight-average molecular weight of the copolymer contained in the hydrolyzable copolymer solution (A-10) was 6,400.

Production Example 11: Production of Hydrolyzable Copolymer Solution (A-11)

15 parts of PGM and 65 parts of xylene were put into a four-neck flask equipped with a condenser, a thermometer, a dropping funnel and a stirrer, and heated up to 100° C. with stirring. Subsequently, a transparent mixture of 42.1 parts of methyl methacrylate, 17.9 parts of ethyl acrylate, 40 parts of FM-0711 (product mane, manufactured by JNC Corporation), 10 parts of xylene, 11.9 parts of PGM, 1.2 parts of a chain transfer (Nofmer MSD (product name) manufactured by NOF Corporation), 2.5 parts of AIBN, and 0.8 parts of AMBN was dropwise added thereto through the dropping funnel at a constant rate, taking 6 hours. After dropwise addition, 0.5 parts of tert-butyl peroctoate and 10 parts of xylene were dropwise added, taking 30 minutes, and further stirred for 1 hour and 30 minutes, and thereafter 10.1 parts of xylene was added to give a transparent hydrolyzable copolymer solution (A-11) having a heating residue of 44.4% and a Gardner viscosity +C.

When the resultant hydrolyzable copolymer was analyzed through GPC (with HLC-8120GPC (product name) manufactured by Tosoh Corporation, eluent: dimethylformamide), the weight-average molecular weight of the copolymer contained in the hydrolyzable copolymer solution (A-11) was 6,600.

The constitutions of the monomer components of the hydrolyzable copolymer solutions (A-6) to (A-11) are summarized in Table 2.

TABLE 2

| | | | Production Example 6 (A-6) | Production Example 7 (A-7) | Production Example 8 (A-8) | Production Example 9 (A-9) | Production Example 10 (A-10) | Production Example 11 (A-11) |
|---|---|---|---|---|---|---|---|---|
| Monomer Composition | (a12) | M1 | 21.7 | 21.7 | 21.7 | 21.7 | | |
| | | M2 | | | | | 42.5 | |
| | (a21) | FM-0711 *1 | 40.0 | 20.0 | | | 30.0 | 40.0 |
| | | FM-0721 *2 | | | 10.0 | | | |
| | (a22) | FM-7711 *4 | | | | 10.0 | 10.0 | |
| | | FM-7721 *5 | | | | | 10.0 | |

TABLE 2-continued

|  |  | Production Example 6 (A-6) | Production Example 7 (A-7) | Production Example 8 (A-8) | Production Example 9 (A-9) | Production Example 10 (A-10) | Production Example 11 (A-11) |
| --- | --- | --- | --- | --- | --- | --- | --- |
| (a3) | Methyl methacrylate | 32.3 | 32.3 | 32.3 | 32.3 | 18.0 | 42.1 |
|  | Ethyl acrylate | 17.9 | 37.9 | 47.9 | 47.9 | 15.0 | 17.9 |
|  | Total | 111.9 | 111.9 | 111.9 | 111.9 | 125.5 | 100.0 |

The components in Table 2 are as follows.

*1 FM-0711: one-terminal methacryloyloxyalkyl-modified organopolysiloxane, average molecular weight Mn = 1,000, manufactured by JNC Corporation

*2 FM-0721: one-terminal methacryloyloxyalkyl-modified organopolysiloxane, average molecular weight Mn = 5,000, manufactured by JNC Corporation

*4 FM-7711: both-terminal methacryloyloxyalkyl-modified organopolysiloxane, average molecular weight Mn = 1,000, manufactured by JNC Corporation

*5 FM-7721: both-terminal methacryloyloxyalkyl-modified organopolysiloxane, average molecular weight Mn = 5,000, manufactured by JNC Corporation Examples 1 to 27, and Comparative Examples 1 to 4: Production of Antifouling Coating Composition and Antifouling Coating Film Constituent Components:

The constituent components used in the antifouling coating compositions are shown in Table 3.

TABLE 3

| | Components | | Chemical Formulae, Characteristics, and Manufacturing Companies |
| --- | --- | --- | --- |
| (B) | Medetomidine | | Manufactured by I-tech AB Corporation, "Selektope", chemical name: (±)-4-[1-(2,3-dimethylphenyl)ethyl]-1H-imidazole |
| (C) | Zinc oxide | | Manufactured by Hakusui Tech Co., Ltd., "Zinc Oxide Class 3" |
| (D) | Polyester-based polymer | Polyester-based polymer 1 | Manufactured by Hitachi Chemical Co., Ltd., "Teslac 2474", Mn 2,000 Constituent components: neopentyl glycol ethylene glycol/isophthalic acid-adipic acid, hydroxyl value 120 mgKOH/g, solid content 98.5% by mass |
| | | Polyester-based polymer 2 | Manufactured by Hitachi Chemical Co., Ltd., "Teslac 2462", Mn 2,000 Constituent components: methylpentanediol and adipic acid, hydroxyl value 56 mgKOH/g |
| (E) | Wetting dispersant | Wetting dispersant | Manufactured by BYK Japan KK, "Disperbyk108" |
| (F) | Other antifouling agents | Cuprous oxide | Manufactured by NC TECH Co., Ltd., "cuprous oxide NC-301" |
| | | Copper pyrithione | Manufactured by Arch UK Biocides Ltd., "Copper Omadine Powder" Chemical formula: $Cu(-S-C_5H_4N-O-)_2$ |
| | | Zinc pyrithione | Manufactured by Arch UK Biocides Ltd., "Copper Omadine Powder" chemical formula: $Zn(-S-C_5H_4N-O-)_2$ |
| | | Pyridine-triphenylborane | Manufactured by Hokko Chemical Industry Co., Ltd., "PK" |
| (G) | Monocarboxylic acid compound | Rosin | WW Rosin (made in China) |
| (H) | Other pigments | Red iron oxide | Manufactured by Morishita Bengara Kogyo Co., Ltd., "Bengara No. 404" |
| | | Talc | Manufactured by Takehara Kagaku Kogyo Co., Ltd., "TTK Talc" |
| | | Calcium sulfate | Manufactured by San Esu Gypsum Co., Ltd., "AS Gypsum" |
| (I) | Other binder component | Chlorinated paraffin | Manufactured by Tosoh Corporation, "Toyoparax 150" |
| (J) | Dehydrating agent | Alkoxysilane | Manufactured by Colcoat Co., Ltd., "Ethyl Silicate 28" |
| (K) | Organic solvents | Xylene | — |
| | | PGM | Propylene glycol monomethyl ether |
| (L) | Anti-sagging agent/anti-settling agent | Fatty acid amide | Manufactured by Kusumoto Chemicals, Ltd., "Disparlon 6900-20X" (solid content 20% by mass) |
| | | Oxidized polyethylene | Manufactured by Itoh Oil Chemicals, Co., Ltd., "A-S-A D-120" (solid content 20% by mass) |

<Production of Antifouling Coating Composition>

At the blending ratio shown in Table 4 and Table 5, the constituent components were mixed with stirring to give an antifouling coating composition. The blending amount of each component shown in Table 4 and Table 5 indicates the blending amount on a wet-weight basis thereof. For example, in Example 1, the blending amount of the fatty acid amide on a wet-weight basis thereof (as a whole) is 2.0 parts by mass and the solid content thereof is 20%, and therefore the blending amount of the fatty acid itself as an active ingredient is 0.4 parts by mass.

TABLE 4

| | | | | Example | | | | |
|---|---|---|---|---|---|---|---|---|
| | | | | 1 | 2 | 3 | 4 | 5 |
| Blending amount (part by mass) | (A) *6 | A-1 (solid content 59.2%) | | 20.0 | | | | 20.0 |
| | | A-2 (solid content 59.1%) | | | 20.0 | | | |
| | | A-3 (solid content 59.7%) | | | | 20.0 | | |
| | | A-4 (solid content 59.2%) | | | | | 20.0 | |
| | | A-5 (solid content 60.3%) | | | | | | |
| | (B) | Medetomidine | | 0.1 | 0.1 | 0.1 | 0.1 | 0.5 |
| | (C) | Zinc oxide | | 5.0 | 5.0 | 5.0 | 5.0 | 5.0 |
| | (D) | Polyester-based polymer 1 (solid content 98.5%) | | | | | | |
| | | Polyester-based polymer 2 | | | | | | |
| | (F) | Cuprous oxide | | 45.0 | 45.0 | 45.0 | 45.0 | 43.0 |
| | | Copper pyrithione | | 2.0 | 2.0 | 2.0 | 2.0 | 2.0 |
| | (G) | Rosin | | 3.0 | 3.0 | 3.0 | 3.0 | 3.0 |
| | (H) | Red iron oxide | | 2.0 | 2.0 | 2.0 | 2.0 | 2.0 |
| | | Talc | | 5.0 | 5.0 | 5.0 | 5.0 | 5.0 |
| | (J) | Alkoxysilane (solid content 97%) | | 0.5 | 0.5 | 0.5 | 0.5 | 0.5 |
| | (K) | Xylene | | 13.0 | 13.0 | 13.0 | 13.0 | 13.0 |
| | | PGM | | 0.4 | 0.4 | 0.4 | 0.4 | 2.0 |
| | (L) | Fatty acid amide (solid content 20%) | | 2.0 | 2.0 | 2.0 | 2.0 | 2.0 |
| | | Oxidized polyethylene (solid content 20%) | | 2.0 | 2.0 | 2.0 | 2.0 | 2.0 |
| | | Total (part by mass) | | 100.0 | 100.0 | 100.0 | 100.0 | 100.0 |
| Calculated Value | | Coating composition solid content (wt %) | | 75.2% | 75.2% | 75.3% | 75.2% | 73.6% |
| | | Content (A) in coating composition solid content (wt %) | | 15.7 | 15.7 | 15.9 | 15.7 | 16.1 |
| | | Content (B) in coating composition solid content (wt %) | | 0.1 | 0.1 | 0.1 | 0.1 | 0.7 |
| Results | | Antifouling Test 1 (accelerated barnacle resistance) | 6 months | 5 | 5 | 5 | 5 | 5 |
| | | | 12 months | 5 | 5 | 5 | 5 | 5 |
| | | Antifouling Test 2 (accelerated slime resistance) | 6 months | 4 | 4 | 4 | 4 | 4 |
| | | | 12 months | 3 | 4 | 3 | 4 | 3 |
| | | Antifouling Test 3 (dynamic slime resistance) | 6 months | 5 | 5 | 5 | 4 | 5 |
| | | | 12 months | 3 | 4 | 3 | 4 | 3 |
| | | Cracking resistance (accelerated) | | 4 | 4 | 4 | 4 | 4 |

| | | | Example | | | Comparative Example | |
|---|---|---|---|---|---|---|---|
| | | | 6 | 7 | 8 | 1 | 2 |
| Blending amount (part by mass) | (A) *6 | A-1 (solid content 59.2%) | 36.0 | 20.0 | 18.5 | | 20.0 |
| | | A-2 (solid content 59.1%) | | | | | |
| | | A-3 (solid content 59.7%) | | | | | |
| | | A-4 (solid content 59.2%) | | | | | |
| | | A-5 (solid content 60.3%) | | | | 20.0 | |
| | (B) | Medetomidine | 0.1 | 0.1 | 0.5 | 0.1 | |
| | (C) | Zinc oxide | 5.0 | | 5.0 | 5.0 | 5.0 |
| | (D) | Polyester-based polymer 1 (solid content 98.5%) | | | 1.0 | | |
| | | Polyester-based polymer 2 | | | | | |
| | (F) | Cuprous oxide | 29.0 | 50.0 | 43.0 | 45.0 | 45.0 |
| | | Copper pyrithione | 2.0 | 2.0 | 2.0 | 2.0 | 2.0 |
| | (G) | Rosin | 5.0 | 3.0 | 2.8 | 3.0 | 3.0 |
| | (H) | Red iron oxide | 1.0 | 2.0 | 2.0 | 2.0 | 2.0 |
| | | Talc | 3.0 | 5.0 | 5.0 | 5.0 | 5.0 |
| | (J) | Alkoxysilane (solid content 97%) | 0.5 | 0.5 | 0.5 | 0.5 | 0.5 |

TABLE 4-continued

|  |  |  |  |  |  |  |  |  |
|---|---|---|---|---|---|---|---|---|
|  | (K) | Xylene |  | 14.0 | 13.0 | 13.7 | 13.0 | 13.1 |
|  |  | PGM |  | 0.4 | 0.4 | 2.0 | 0.4 | 0.4 |
|  | (L) | Fatty acid amide (solid content 20%) |  | 2.0 | 2.0 | 2.0 | 2.0 | 2.0 |
|  |  | Oxidized polyethylene (solid content 20%) |  | 2.0 | 2.0 | 2.0 | 2.0 | 2.0 |
|  |  | Total (part by mass) |  | 100.0 | 100.0 | 100.0 | 100.0 | 100.0 |
| Calculated Value | Coating composition solid content (wt %) |  |  | 67.7% | 75.2% | 73.5% | 75.4% | 75.1% |
|  | Content (A) in coating composition solid content (wt %) |  |  | 31.5 | 15.7 | 14.9 | 16.0 | 15.8 |
|  | Content (B) in coating composition solid content (wt %) |  |  | 0.1 | 0.1 | 0.7 | 0.1 | 0.0 |
| Results | Antifouling Test 1 (accelerated barnacle resistance) | 6 months |  | 5 | 5 | 5 | 5 | 3 |
|  |  | 12 months |  | 5 | 4 | 5 | 5 | 2 |
|  | Antifouling Test 2 (accelerated slime resistance) | 6 months |  | 4 | 3 | 4 | 2 | 4 |
|  |  | 12 months |  | 4 | 3 | 4 | 2 | 3 |
|  | Antifouling Test 3 (dynamic slime resistance) | 6 months |  | 5 | 3 | 5 | 2 | 4 |
|  |  | 12 months |  | 4 | 3 | 4 | 2 | 3 |
|  | Cracking resistance (accelerated) |  |  | 4 | 4 | 5 | 4 | 4 |

*6: As solvent, xylene used in producing the component (A) is contained.

TABLE 5

|  |  |  | Example | | | | | | | |
|---|---|---|---|---|---|---|---|---|---|---|
|  |  |  | 9 | 10 | 11 | 12 | 13 | 14 | 15 | 16 |
| Blending amount (part by mass) | (A) *6 | A-6 (solid content 45.1%) | 40.0 |  |  |  |  | 40.0 | 40.0 |  |
|  |  | A-7 (solid content 45.4%) |  | 40.0 |  |  |  |  |  |  |
|  |  | A-8 (solid content 45.7%) |  |  | 40.0 |  |  |  |  |  |
|  |  | A-9 (solid content 46.1%) |  |  |  | 40.0 |  |  |  |  |
|  |  | A-10 (solid content 45.6%) |  |  |  |  | 40.0 |  |  | 40.0 |
|  |  | A-11 (solid content 44.4%) |  |  |  |  |  |  |  |  |
|  | (B) | Medetomidine | 0.1 | 0.1 | 0.1 | 0.1 | 0.1 | 0.1 | 0.1 | 0.1 |
|  | (C) | Zinc oxide | 6.0 | 6.0 | 6.0 | 6.0 | 6.0 | 6.0 | 6.0 | 6.0 |
|  | (D) | Polyester-based polymer 1 (solid content 98.5%) | 1.5 | 1.5 | 1.5 | 1.5 | 1.5 |  |  | 1.5 |
|  |  | Polyester-based polymer 2 |  |  |  |  |  | 1.5 |  |  |
|  | (E) | Wetting dispersant | 0.5 | 0.5 | 0.5 | 0.5 | 0.5 | 0.5 | 0.5 |  |
|  | (F) | Cuprous oxide | 38.0 | 38.0 | 38.0 | 38.0 | 38.0 | 38.0 | 38.0 | 38.0 |
|  |  | Copper pyrithione | 2.5 | 2.5 | 2.5 | 2.5 | 2.5 | 2.5 | 2.5 | 2.5 |
|  |  | Zinc pyrithione |  |  |  |  |  |  |  |  |
|  |  | Pyridine-triphenylborane |  |  |  |  |  |  |  |  |
|  | (G) | Rosin |  |  |  |  |  |  |  |  |
|  |  | Versatic acid |  |  |  |  |  |  |  |  |
|  | (H) | Red iron oxide | 0.5 | 0.5 | 0.5 | 0.5 | 0.5 | 0.5 | 0.5 | 0.5 |
|  |  | Talc | 1.5 | 1.5 | 1.5 | 1.5 | 1.5 | 1.5 | 1.5 | 1.5 |
|  | (I) | Chlorinated paraffin |  |  |  |  |  |  | 1.5 |  |
|  | (K) | Xylene | 5.5 | 5.5 | 5.5 | 5.5 | 5.5 | 5.5 | 5.5 | 6.0 |
|  |  | PGM | 1.9 | 1.9 | 1.9 | 1.9 | 1.9 | 1.9 | 1.9 | 1.9 |
|  | (L) | Fatty acid amide (solid content 20%) | 1.5 | 1.5 | 1.5 | 1.5 | 1.5 | 1.5 | 1.5 | 1.5 |
|  |  | Oxidized polyethylene (solid content 20%) | 0.5 | 0.5 | 0.5 | 0.5 | 0.5 | 0.5 | 0.5 | 0.5 |
|  |  | Total (part by mass) | 100.0 | 100.0 | 100.0 | 100.0 | 100.0 | 100.0 | 100.0 | 100.0 |
| Calculated value | Coating composition solid content (wt %) |  | 69.0% | 69.1% | 69.3% | 69.4% | 69.2% | 69.0% | 69.0% | 68.7% |
|  | Content (A) in coating composition solid content (wt %) |  | 26.1 | 26.3 | 26.4 | 26.6 | 26.4 | 26.1 | 26.1 | 26.5 |
|  | Content (B) in coating composition solid content (wt %) |  | 0.1 | 0.1 | 0.1 | 0.1 | 0.1 | 0.1 | 0.1 | 0.1 |
| Results | Antifouling Test 1 (accelerated barnacle resistance) | 6 months | 5 | 5 | 5 | 5 | 5 | 5 | 5 | 5 |
|  |  | 12 months | 5 | 5 | 5 | 5 | 5 | 5 | 5 | 5 |
|  | Antifouling Test 2 (accelerated slime resistance) | 6 months | 5 | 4 | 4 | 4 | 4 | 4 | 4 | 4 |
|  |  | 12 months | 4 | 4 | 3 | 4 | 4 | 4 | 3 | 4 |
|  | Antifouling Test 3 (dynamic slime resistance) | 6 months | 5 | 5 | 5 | 5 | 5 | 5 | 3 | 5 |
|  |  | 12 months | 5 | 4 | 3 | 3 | 5 | 5 | 3 | 5 |
|  | Cracking resistance (accelerated) |  | 5 | 5 | 5 | 5 | 5 | 5 | 5 | 4 |

TABLE 5-continued

|  |  |  | Example | | | | | | | |
|---|---|---|---|---|---|---|---|---|---|---|
|  |  |  | 17 | 18 | 19 | 20 | 21 | 22 | 23 | 24 |
| Blending amount (part by mass) | (A) *6 | A-6 (solid content 45.1%) | 23.0 |  |  | 60.0 | 60.0 | 90.0 |  |  |
|  |  | A-7 (solid content 45.4%) |  | 42.0 | 42.0 |  |  |  |  |  |
|  |  | A-8 (solid content 45.7%) |  |  |  |  |  |  |  |  |
|  |  | A-9 (solid content 46.1%) |  |  |  |  |  |  |  |  |
|  |  | A-10 (solid content 45.6%) |  |  |  |  |  |  |  |  |
|  |  | A-11 (solid content 44.4%) |  |  |  |  |  |  | 90.0 |  |
|  |  |  |  |  |  |  |  |  |  | 90.0 |
|  | (B) | Medetomidine | 0.1 | 0.1 | 0.1 | 0.1 | 0.1 | 0.1 | 0.1 | 0.1 |
|  | (C) | Zinc oxide | 8.0 | 22.0 | 22.0 | 13.0 |  | 2.0 | 2.0 | 2.0 |
|  | (D) | Polyester-based polymer 1 (solid content 98.5%) |  | 2.0 | 2.0 | 2.0 | 2.0 | 2.5 | 2.5 | 2.5 |
|  |  | Polyester-based polymer 2 |  |  |  |  |  |  |  |  |
|  | (E) | Wetting dispersant | 0.5 | 0.5 | 0.5 |  |  |  |  |  |
|  | (F) | Cuprous oxide | 48.0 |  |  |  |  |  |  |  |
|  |  | Copper pyrithione | 3.0 |  | 4.0 |  |  |  |  |  |
|  |  | Zinc pyrithione |  | 5.0 |  |  |  |  |  |  |
|  |  | Pyridine-triphenylborane |  | 3.0 |  |  |  |  |  |  |
|  | (G) | Rosin |  |  |  |  |  |  |  |  |
|  |  | Versatic acid | 2.0 |  |  |  |  |  |  |  |
|  | (H) | Red iron oxide | 1.0 | 3.0 | 3.0 | 3.0 | 3.0 | 3.0 | 3.0 | 3.0 |
|  |  | Talc | 2.0 | 2.0 | 2.0 | 2.0 | 15.0 |  |  |  |
|  | (I) | Chlorinated paraffin | 1.5 |  |  |  |  |  |  |  |
|  | (K) | Xylene | 7.0 | 16.0 | 20.0 | 15.5 | 15.5 |  |  |  |
|  |  | PGM | 1.9 | 2.4 | 2.4 | 2.4 | 2.4 | 0.4 | 0.4 | 0.4 |
|  | (L) | Fatty acid amide (solid content 20%) | 1.5 | 1.5 | 1.5 | 1.5 | 1.5 | 2.0 | 2.0 | 2.0 |
|  |  | Oxidized polyethylene (solid content 20%) | 0.5 | 0.5 | 0.5 | 0.5 | 0.5 |  |  |  |
|  |  | Total (part by mass) | 100.0 | 100.0 | 100.0 | 100.0 | 100.0 | 100.0 | 100.0 | 100.0 |
| Calculated value |  | Coating composition solid content (wt %) | 76.9% | 57.0% | 53.0% | 47.5% | 47.5% | 48.6% | 48.8% | 49.1% |
|  |  | Content (A) in coating composition solid content (wt %) | 13.5 | 33.4 | 36.0 | 56.9 | 56.9 | 83.6 | 83.7 | 83.8 |
|  |  | Content (B) in coating composition solid content (wt %) | 0.1 | 0.2 | 0.2 | 0.2 | 0.2 | 0.2 | 0.2 | 0.2 |
| Results | Antifouling Test 1 (accelerated barnacle resistance) | 6 months | 5 | 5 | 5 | 5 | 5 | 5 | 5 | 5 |
|  |  | 12 months | 5 | 5 | 5 | 5 | 4 | 5 | 5 | 5 |
|  | Antifouling Test 2 (accelerated slime resistance) | 6 months | 3 | 4 | 4 | 5 | 3 | 5 | 5 | 5 |
|  |  | 12 months | 3 | 4 | 3 | 4 | 3 | 5 | 5 | 4 |
|  | Antifouling Test 3 (dynamic slime resistance) | 6 months | 3 | 4 | 5 | 5 | 4 | 5 | 5 | 5 |
|  |  | 12 months | 3 | 4 | 5 | 4 | 3 | 5 | 4 | 5 |
|  | Cracking resistance (accelerated) |  | 5 | 4 | 4 | 5 | 4 | 5 | 5 | 5 |

|  |  |  | Example | | | Comparative Example | |
|---|---|---|---|---|---|---|---|
|  |  |  | 25 | 26 | 27 | 3 | 4 |
| Blending amount (part by mass) | (A) *6 | A-6 (solid content 45.1%) |  |  | 90.0 | 40.0 |  |
|  |  | A-7 (solid content 45.4%) |  |  |  |  |  |
|  |  | A-8 (solid content 45.7%) |  |  |  |  |  |
|  |  | A-9 (solid content 46.1%) | 90.0 |  |  |  |  |
|  |  | A-10 (solid content 45.6%) |  | 90.0 |  |  |  |
|  |  | A-11 (solid content 44.4%) |  |  |  |  | 90.0 |
|  | (B) | Medetomidine | 0.1 | 0.1 | 0.1 |  | 0.1 |
|  | (C) | Zinc oxide | 2.0 | 2.0 |  | 6.0 | 2.0 |
|  | (D) | Polyester-based polymer 1 (solid content 98.5%) | 2.5 | 2.5 | 2.5 | 1.5 | 2.5 |
|  |  | Polyester-based polymer 2 |  |  |  |  |  |
|  | (E) | Wetting dispersant |  |  |  | 0.5 |  |
|  | (F) | Cuprous oxide |  |  |  | 38.0 |  |
|  |  | Copper pyrithione |  |  |  | 2.5 |  |
|  |  | Zinc pyrithione |  |  |  |  |  |
|  |  | Pyridine-triphenylborane |  |  |  |  |  |
|  | (G) | Rosin |  |  |  |  |  |
|  |  | Versatic acid |  |  |  |  |  |
|  | (H) | Red iron oxide | 3.0 | 3.0 | 3.0 | 0.5 | 3.0 |
|  |  | Talc |  |  |  | 1.5 |  |

TABLE 5-continued

| | | | | | | | |
|---|---|---|---|---|---|---|---|
| | (I) | Chlorinated paraffin | | | | | |
| | (K) | Xylene | | | | 2.0 | 5.5 | |
| | | PGM | 0.4 | 0.4 | 0.4 | 2.0 | 0.4 |
| | (L) | Fatty acid amide (solid content 20%) | 2.0 | 2.0 | 2.0 | 1.5 | 2.0 |
| | | Oxidized polyethylene (solid content 20%) | | | | 0.5 | |
| | | Total (part by mass) | 100.0 | 100.0 | 100.0 | 100.0 | 100.0 |
| Calculated value | | Coating composition solid content (wt %) | 49.5% | 49.0% | 46.6% | 68.9% | 47.9% |
| | | Content (A) in coating composition solid content (wt %) | 83.9 | 83.8 | 87.2 | 26.2 | 83.4 |
| | | Content (B) in coating composition solid content (wt %) | 0.2 | 0.2 | 0.2 | 0.0 | 0.2 |
| Results | | Antifouling Test 1 | 6 months | 5 | 5 | 5 | 3 | 4 |
| | | (accelerated barnacle resistance) | 12 months | 5 | 5 | 4 | 2 | 4 |
| | | Antifouling Test 2 | 6 months | 5 | 5 | 5 | 3 | 2 |
| | | (accelerated slime resistance) | 12 months | 4 | 5 | 4 | 2 | 1 |
| | | Antifouling Test 3 | 6 months | 5 | 5 | 5 | 3 | 2 |
| | | (dynamic slime resistance) | 12 months | 4 | 5 | 5 | 3 | 2 |
| | | Cracking resistance (accelerated) | | 5 | 5 | 5 | 5 | 5 |

*6: As solvent, xylene and PGM used in producing the component (A) are contained.

—Antifouling Test 1 (Accelerated Barnacle Resistance)—

An epoxy-based anti-corrosive paint (epoxy AC paint, product name "Bannoh 500" manufactured by Chugoku Marine Paints, Ltd.) was applied to a sandblasted steel plate (length 300 mm×width 100 mm×thickness 2.3 mm) to have a dry film thickness of about 100 μm, and then an epoxy-based binder paint (product name "Bannoh 500N" manufactured by Chugoku Marine Paints, Ltd.) was applied thereon to have a dry film thickness of about 100 μm. Further on this, the antifouling coating composition of Examples and Comparative Examples was applied once to have a dry film thickness of about 200 μm, and then dried at 25° C. for 7 days to produce an antifouling coating film-attached test plate. The three coating operations were carried out at a pace of one coating operation a day.

The antifouling test plate produced in the manner as above was immersed in seawater at 40° C. for 3 months to be an acceleratedly degraded test plate, and then this was immersed in Tokyo Bay at a position of about 1 meter below sea level in such a matter that the test surface could be horizontal to the sea surface and the coated surface could face the sea bottom. Under the condition, the test plate is especially readily fouled by barnacles because of the characteristics of the marine area in which the test plate is immersed and of the test condition. In 6 months and 12 months after the start of immersion under the condition as above, the barnacles-adhering area of the antifouling coating film was measured, and according to <Criteria for antifouling performance valuation based on barnacles-adhering area> mentioned below, the barnacle resistance of the antifouling coating film was evaluated. The results are shown in Table 4 and Table 5.

<Criteria for Antifouling Performance Valuation Based on Barnacles-Adhering Area>

5: The total area occupied by barnacles in the test surface was less than 1% of the entire area.

4: The above area was 1% or more and less than 10% of the entire area.

3: The above area was 10% or more and less than 30% of the entire area.

2: The above area was 30% or more and less than 70% of the entire area.

1: The above area was 70% or more of the entire area.

—Antifouling Test 2 (Accelerated Slime Resistance)—

In the same manner as in the above antifouling test 1, acceleratedly degraded test plates with each coating composition of Examples and Comparative Examples were prepared, and immersed in Hiroshima Bay at a position of about 0.5 meters below sea level in such a matter that the test surface could be horizontal to the sea surface and the coated surface could face opposite to the sea bottom (that is, could face the sea surface). Under the condition, the test plate is especially readily fouled by slime and botanical marine organisms because of the characteristics of the marine area in which the test plate is immersed and of the test condition. In 6 months and 12 months after the start of immersion under the condition as above, the area occupied by marine organisms including slime of the antifouling coating film was measured, and according to <Criteria for antifouling performance valuation based on marine organisms-occupied area> mentioned below, the antifouling performance of the antifouling coating film was evaluated. The results are shown in Table 4 and Table 5.

<Criteria for Antifouling Performance Valuation Based on Marine Organisms-Occupied Area>

5: The total area occupied by marine organisms in the test surface was less than 1% of the entire area.

4: The above area was 1% or more and less than 10% of the entire area.

3: The above area was 10% or more and less than 30% of the entire area.

2: The above area was 30% or more and less than 70% of the entire area.

1: The above area was 70% or more of the entire area.

—Antifouling Test 3 (Dynamic Slime Resistance)—

In the same manner as in the above antifouling test 1 except that the sandblasted steel plate (length 200 mm×width 100 mm×thickness 2.3 mm) was changed, acceleratedly degraded test plates with each coating composition of Examples and Comparative Examples were prepared, attached to a rotating cylinder and immersed in Hiroshima Bay at a position of about 0.5 meters below sea level in such a matter that the test surface could run at a speed of about 15 knots. In 6 months and 12 months after the start of immersion under the condition as above, the slime occupied area of the antifouling coating film was measured, and according to <Criteria for antifouling performance valuation based on slime-occupied area> mentioned below, the slime resistance of the antifouling coating film was evaluated. The results are shown in Table 4 and Table 5. Under the condition, the test plate is especially readily fouled by slime and botanical marine organisms because of the characteristics of the marine area in which the test plate is immersed and of the test condition. In 6 months and 12 months after the start of immersion under the condition as above, the area occupied by marine organisms including slime in the antifouling coating film was measured, and according to <Criteria for antifouling performance valuation based on slime-occupied area> mentioned below, the antifouling performance of the antifouling coating film was evaluated. The results are shown in Table 4 and Table 5.

<Criteria for Antifouling Performance Valuation Based on Slime-Occupied Area>

5: The total area occupied by slime in the test surface was less than 1% of the entire area.

4: The above area was 1% or more and less than 10% of the entire area.

3: The above area was 10% or more and less than 30% of the entire area.

2: The above area was 30% or more and less than 70% of the entire area.

1: The above area was 70% or more of the entire area.

—Cracking Resistance Test (Accelerated)—

An epoxy-based anti-corrosive paint (epoxy AC paint, product name "Bannoh 500" manufactured by Chugoku Marine Paints, Ltd.) was applied to a sandblasted steel plate (length 150 mm×width 70 mm×thickness 1.6 mm) to have a dry film thickness of about 100 μm, and then an epoxy-based binder paint (product name "Bannoh 500N" manufactured by Chugoku Marine Paints, Ltd.) was applied thereon to have a dry film thickness of about 100 μm. Further on this, the antifouling coating composition of Examples and Comparative Examples was applied once to have a dry film thickness of about 400 μm, and then dried at 25° C. for 7 days to produce an antifouling coating film-attached test plate. The three coating operations were carried out at a pace of one coating operation a day.

The antifouling test plate produced in the manner as above was immersed in seawater immersion tank kept at 50° C. for 5 months with changing the seawater in the tank once a week, and then the coating film was checked for cracking according to <Criteria for cracking resistance evaluation> mentioned below. The results are shown in Table 4 and Table 5.

<Criteria for Cracking Resistance Evaluation>

5: Neither hair cracks (fine and thin cracks) having a length of 1 mm or more nor cracks (ordinary cracks) having a width of 2 mm or more formed in the test surface.

4: Hair cracks (fine and thin cracks) having a length of 1 mm or more and less than 5 mm formed in the test surface, but cracks (ordinary cracks) having a width of 2 mm or more did not form therein.

3: Hair cracks (fine and thin cracks) having a length of 5 mm or more formed in the test surface, but cracks (ordinary cracks) having a width of 2 mm or more did not form therein.

2: Cracks (ordinary cracks) having a width of 2 mm or more and/or peeling occurred in the test surface, but the coating film remained.

1: The coating film peeled from the test surface (cracking resistance evaluation was impossible).

As obvious from the results of Examples and Comparative Examples, the present invention can provide an antifouling coating film excellent in antifouling performance against animal species such as barnacles and against slime, and also excellent in cracking resistance, an antifouling coating composition capable of forming the coating film, as well as a substrate with the antifouling coating film and a method for producing the substrate, and an antifouling method using the antifouling coating film.

The invention claimed is:

1. An antifouling coating composition comprising:
a polyorganosiloxane block-comprising hydrolyzable copolymer (A) and medetomidine (B), wherein:
the polyorganosiloxane block-comprising hydrolyzable copolymer (A) comprises:
(i) a constituent unit derived from a hydrolyzable group-comprising monomer (a1) and
(ii) a constituent unit derived from a polyorganosiloxane block-comprising monomer (a2).

2. The antifouling coating composition of claim 1, wherein the polyorganosiloxane block-comprising hydrolyzable copolymer (A) further comprises:
(iii) a constituent unit derived from any other monomer (a3).

3. The antifouling coating composition of claim 1, wherein the hydrolyzable group-comprising monomer (a1) comprises a monomer (a11) represented by the following formula (1-1):

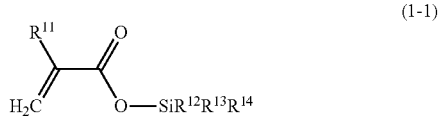

(1-1)

wherein $R^{11}$ represents a hydrogen atom or a methyl group; and $R^{12}$, $R^{13}$ and $R^{14}$ each independently represent a monovalent hydrocarbon group.

4. The antifouling coating composition of claim 1, wherein the hydrolyzable group-comprising monomer (a1) comprises at least one of a monomer (a12) represented by the following formula (1-2) and a monomer (a13) represented by the following formula (1-3):

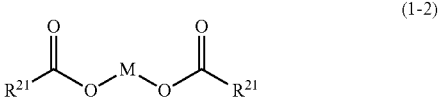

(1-2)

wherein each $R^{21}$ independently represents a monovalent group comprising a terminal ethylenically unsaturated group; and M represents a metal;

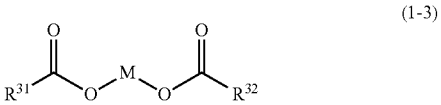

(1-3)

wherein $R^{31}$ represents a monovalent group comprising a terminal ethylenically unsaturated group; $R^{32}$ represents a monovalent organic group having 1 to 30 carbon atoms comprising no terminal ethylenically unsaturated group; and M represents a metal.

5. The antifouling coating composition of claim 4, wherein the hydrolyzable group-comprising monomer (a1) comprises at least one of a monomer (a12') represented by the following formula (1-2') and a monomer (a13') represented by the following formula (1-3'):

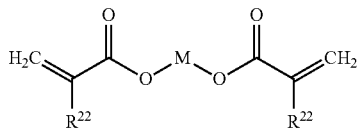
(1-2')

wherein each $R^{22}$ independently represents a hydrogen atom or a methyl group; and M represents copper or zinc;

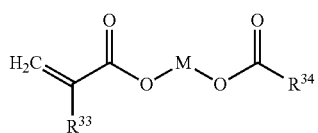
(1-3')

wherein $R^{33}$ represents a hydrogen atom or a methyl group; $R^{34}$ represents a monovalent organic group having 1 to 30 carbon atoms comprising no terminal ethylenically unsaturated group; and M represents copper or zinc.

6. The antifouling coating composition of claim 1, wherein the polyorganosiloxane block-comprising monomer (a2) is represented by the following formula (2):

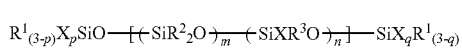
(2)

wherein $R^1$, $R^2$ and $R^3$ each independently represent a monovalent hydrocarbon group; each X independently represents a (meth)acryloyloxyalkyl group or a mercaptoalkyl group; m represents 1 or more; n represents 0 or more; and p and q each independently represent 0 or 1, provided that n +p+q is 1 or more.

7. The antifouling coating composition of claim 1, wherein the polyorganosiloxane block-comprising hydrolyzable copolymer (A) comprises 1 to 50% by mass of a constituent unit derived from the polyorganosiloxane block-comprising monomer (a2).

8. The antifouling coating composition of claim 1, comprising the polyorganosiloxane block-comprising hydrolyzable copolymer (A) in an amount of 10% by mass or more based on a solid content of the antifouling coating composition.

9. The antifouling coating composition of claim 1, comprising the medetomidine (B) in an amount of 0.01 to 5% by mass based on a solid content of the antifouling coating composition.

10. The antifouling coating composition of claim 1, further comprising zinc oxide (C).

11. The antifouling coating composition of claim 1, further comprising a polyester-based polymer (D).

12. The antifouling coating composition of claim 1, further comprising a wetting dispersant (E).

13. An antifouling coating film, which is formed with the antifouling coating composition of claim 1.

14. A substrate coated with the antifouling coating film of claim 13.

15. A method for producing a substrate with an antifouling coating film, the method comprising:
(I) applying the antifouling coating composition of claim 1 on a substrate or impregnating a substrate with the antifouling coating composition, to obtain an applied body or an impregnated body, and
(II) drying the applied body or the impregnated body.

16. An antifouling method comprising contacting a substrate with the antifouling coating film of claim 13.

* * * * *